(12) United States Patent
Lunardi et al.

(10) Patent No.: US 12,684,384 B2
(45) Date of Patent: Jul. 14, 2026

(54) HANDLING QUALITY-OF-EXPERIENCE (QOE) CONFIGURATIONS EXCEEDING MAXIMUM NUMBER

(71) Applicant: Telefonaktiebolaget LM Ericsson (publ), Stockholm (SE)

(72) Inventors: Luca Lunardi, Genoa (IT); Ali Parichehrehteroujeni, Linköping (SE); Filip Barac, Huddinge (SE); Cecilia Eklöf, Täby (SE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 292 days.

(21) Appl. No.: 18/701,679

(22) PCT Filed: Oct. 21, 2022

(86) PCT No.: PCT/SE2022/050956
§ 371 (c)(1),
(2) Date: Apr. 16, 2024

(87) PCT Pub. No.: WO2023/069000
PCT Pub. Date: Apr. 27, 2023

(65) Prior Publication Data
US 2024/0397354 A1 Nov. 28, 2024

Related U.S. Application Data

(60) Provisional application No. 63/270,228, filed on Oct. 21, 2021.

(51) Int. Cl.
*H04W 24/08* (2009.01)
*H04W 24/02* (2009.01)
*H04L 41/0803* (2022.01)

(52) U.S. Cl.
CPC ........... *H04W 24/08* (2013.01); *H04W 24/02* (2013.01)

(58) Field of Classification Search
CPC ..... H04W 24/08; H04W 24/02; H04W 24/10; H04W 28/02; H04L 43/06
(Continued)

(56) References Cited

U.S. PATENT DOCUMENTS

2010/0029266 A1    2/2010   Van et al.
2020/0162949 A1*   5/2020   He ...................... H04L 41/5032
(Continued)

FOREIGN PATENT DOCUMENTS

CN          113115331 A      7/2021
CN          113938921 A      1/2022
(Continued)

OTHER PUBLICATIONS

"3GPP TS 28.405 V16.1.0", 3rd Generation Partnership Project; Technical Specification Group Services and System Aspects; Telecommunication management; Quality of Experience (QoE) measurement collection; Control and configuration (Release 16), Sep. 2021, pp. 1-15.
(Continued)

*Primary Examiner* — Marnie A Matt
(74) *Attorney, Agent, or Firm* — Murphy, Bilak & Homiller, PLLC

(57) ABSTRACT

Embodiments include methods for a RAN node configured to manage configured to manage quality-of-experience (QoE) measurements by user equipment (UEs) operating in the RAN. Such methods include receiving, from a network node or function (NNF), a first number of QoE measurement collection, QMC, configurations and identifying a UE to perform QoE measurements according to the first number of QMC configurations. Such methods include selectively pro-
(Continued)

viding the first number of QMC configurations to the UE, based on the first number and one or more of the following: a maximum number of concurrent QMC configurations the UE can retain, respective priority levels of the first number of QMC configurations, and current signaling load in the RAN. Other embodiments include complementary methods for a UE, as well as RAN nodes and UEs configured to perform such methods.

20 Claims, 12 Drawing Sheets

(58) Field of Classification Search
USPC ........................................................ 370/252
See application file for complete search history.

(56) References Cited

U.S. PATENT DOCUMENTS

| | | | | |
|---|---|---|---|---|
| 2022/0210031 | A1* | 6/2022 | Hu | H04L 43/55 |
| 2022/0400370 | A1* | 12/2022 | Yang | H04W 24/08 |
| 2024/0031832 | A1* | 1/2024 | Parichehrehteroujeni | |
| | | | | H04W 24/08 |
| 2025/0056277 | A1* | 2/2025 | Babaei | H04W 24/08 |
| 2025/0203424 | A1* | 6/2025 | Babaei | H04L 41/5067 |

FOREIGN PATENT DOCUMENTS

| | | | |
|---|---|---|---|
| WO | 2019010606 A1 | 1/2019 | |
| WO | 2021023280 A1 | 2/2021 | |
| WO | 2021098074 A1 | 5/2021 | |
| WO | 2021164019 A1 | 8/2021 | |
| WO | 2022124965 A1 | 6/2022 | |

OTHER PUBLICATIONS

"3GPP TS 38.300 V17.0.0", 3rd Generation Partnership Project; Technical Specification Group Radio Access Network; NR; NR and NG-RAN Overall Description; Stage 2 (Release 17), Mar. 2022, pp. 1-204.

"3GPP TS 38.331 V16.7.0", 3rd Generation Partnership Project; Technical Specification Group Radio Access Network; NR; Radio Resource Control (RRC) protocol specification (Release 16), Dec. 2021, pp. 1-963.

"3GPP TS 38.423 V16.7.0", 3rd Generation Partnership Project; Technical Specification Group Radio Access Network; NG-RAN; Xn application protocol (XnAP) (Release 16), Oct. 2021, pp. 1-466.

"DraftCR for WI eQoE", 3GPP TSG SA WG5 Meeting 138-e, S5-214759, electronic meeting, online, Aug. 23-31, 2021, pp. 1-6.

"ETSI TS 138 463 V16.7.0", 5G; NG-RAN; E1 Application Protocol (E1AP) (3GPP TS 38.463 version 16.7.0 Release 16), Oct. 2021, pp. 1-244.

"3rd Generation Partnership Project; Technical Specification Group Core Network and Terminals; AT command set for User Equipment (UE) (Release 16)", 3GPP TS 27.007 V16.7.0, Dec. 2020, pp. 1-408.

"3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 16)", 3GPP TS 26.247 V16.4.1, Oct. 2020, pp. 1-140.

"Configuration and reporting for NR QoE measurement", 3GPP TSG-RAN WG2 Meeting #113 bis electronic, R2-2103692, Online, Apr. 12-20, 2021, pp. 1-6.

"QoE Reference and maximum number of QoE configurations in Rrc", 3GPP TSG-RAN2 Meeting #115-e, R2-2109200, Electronic meeting, Aug. 9-27, 2021, 1 page.

* cited by examiner

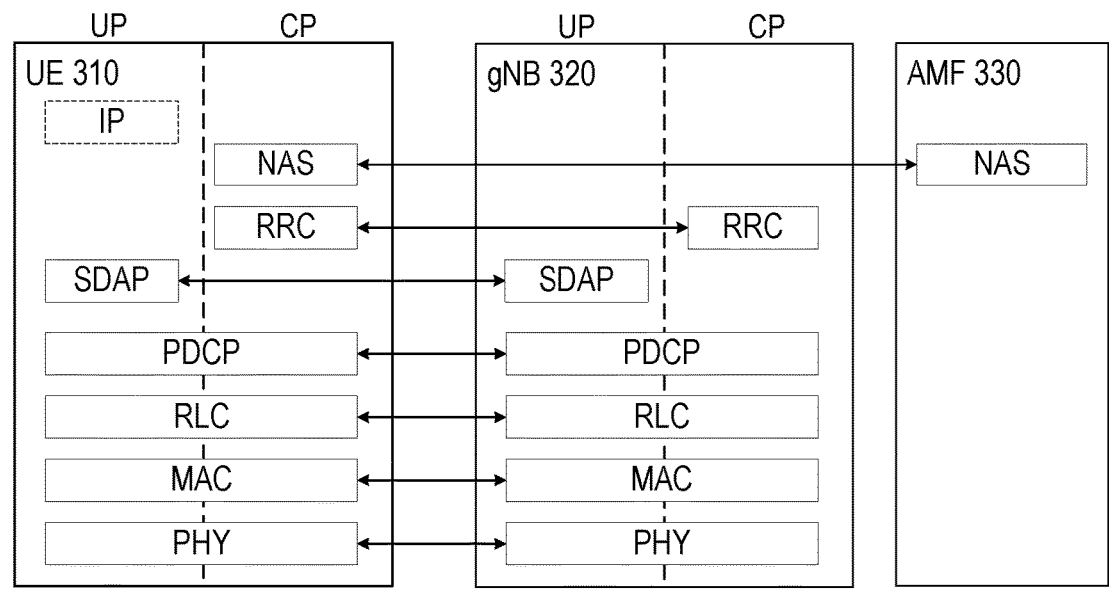

FIG. 3

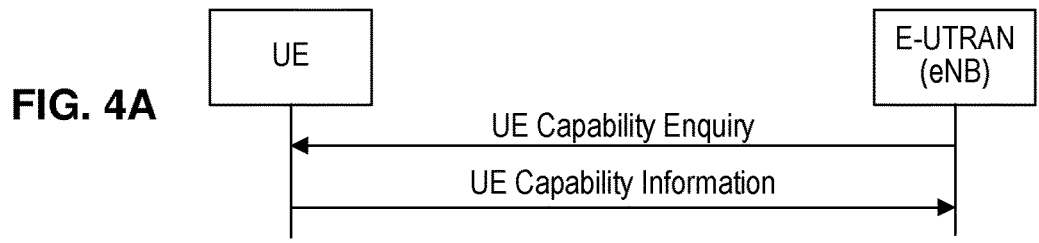

FIG. 4A

```
MeasParameters-v1530 ::=            SEQUENCE {
    qoe-MeasReport-r15                 ENUMERATED {supported}    OPTIONAL,
    qoe-MTSI-MeasReport-r15            ENUMERATED {supported}    OPTIONAL,
    ca-IdleModeMeasurements-r15        ENUMERATED {supported}    OPTIONAL,
    ca-IdleModeValidityArea-r15        ENUMERATED {supported}    OPTIONAL,
    heightMeas-r15                     ENUMERATED {supported}    OPTIONAL,
    multipleCellsMeasExtension-r15   ENUMERATED {supported}    OPTIONAL
}

MeasParameters-v16xy ::=            SEQUENCE {
    qoe-Extensions-r16                 ENUMERATED {supported}    OPTIONAL
}
```

FIG. 4B

```
-- ASN1START
QoE-Reference-r16 ::=    SEQUENCE {
      plmn-Identity-r16    PLMN-Identity,
      qmc-Id-r16              OCTET STRING (SIZE (3))
}
-- ASN1STOP
```

FIG. 4C

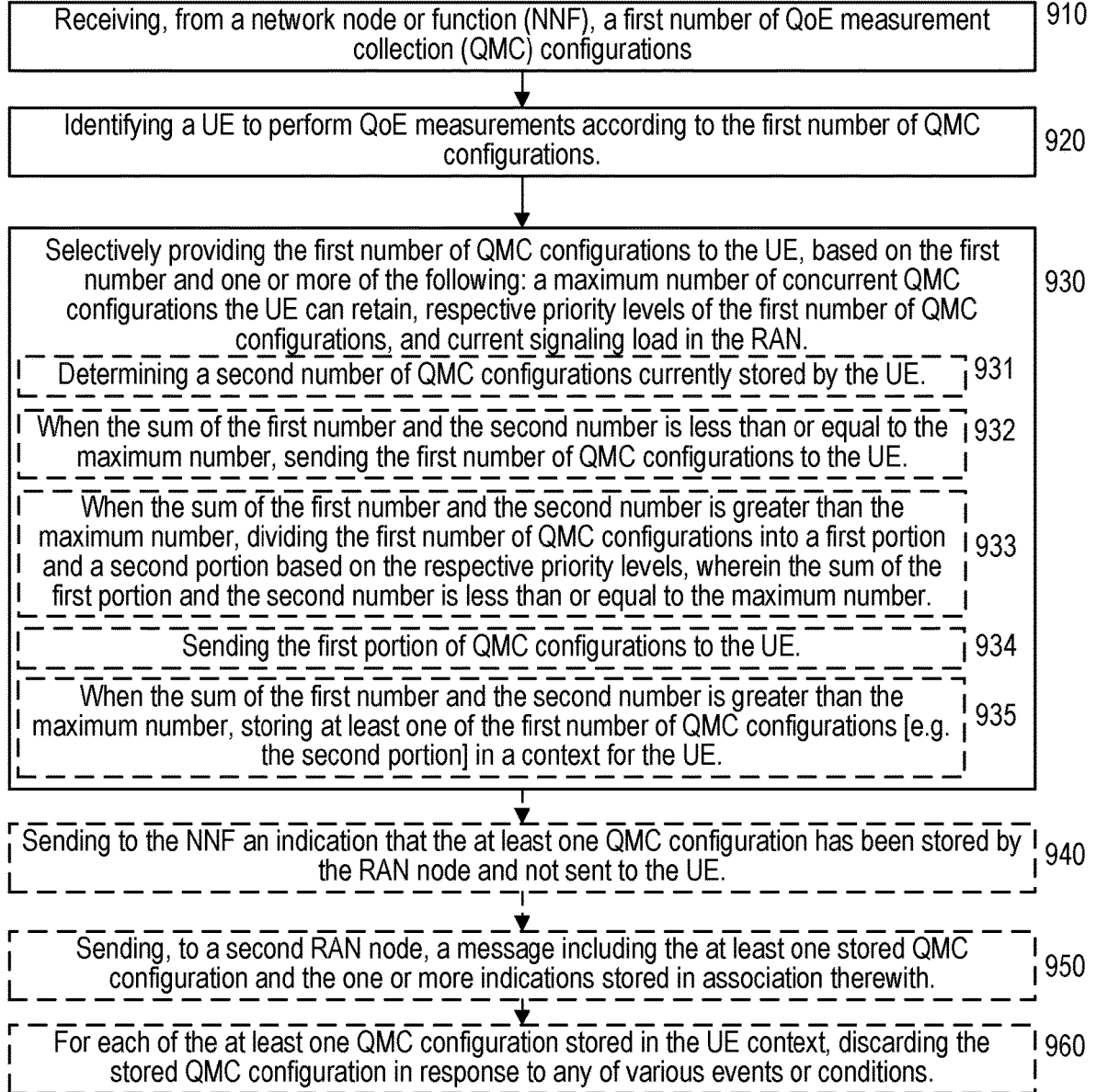

Receiving, from a network node or function (NNF), a first number of QoE measurement collection (QMC) configurations — 910

Identifying a UE to perform QoE measurements according to the first number of QMC configurations. — 920

Selectively providing the first number of QMC configurations to the UE, based on the first number and one or more of the following: a maximum number of concurrent QMC configurations the UE can retain, respective priority levels of the first number of QMC configurations, and current signaling load in the RAN. — 930

Determining a second number of QMC configurations currently stored by the UE. — 931

When the sum of the first number and the second number is less than or equal to the maximum number, sending the first number of QMC configurations to the UE. — 932

When the sum of the first number and the second number is greater than the maximum number, dividing the first number of QMC configurations into a first portion and a second portion based on the respective priority levels, wherein the sum of the first portion and the second number is less than or equal to the maximum number. — 933

Sending the first portion of QMC configurations to the UE. — 934

When the sum of the first number and the second number is greater than the maximum number, storing at least one of the first number of QMC configurations [e.g. the second portion] in a context for the UE. — 935

Sending to the NNF an indication that the at least one QMC configuration has been stored by the RAN node and not sent to the UE. — 940

Sending, to a second RAN node, a message including the at least one stored QMC configuration and the one or more indications stored in association therewith. — 950

For each of the at least one QMC configuration stored in the UE context, discarding the stored QMC configuration in response to any of various events or conditions. — 960

FIG. 9

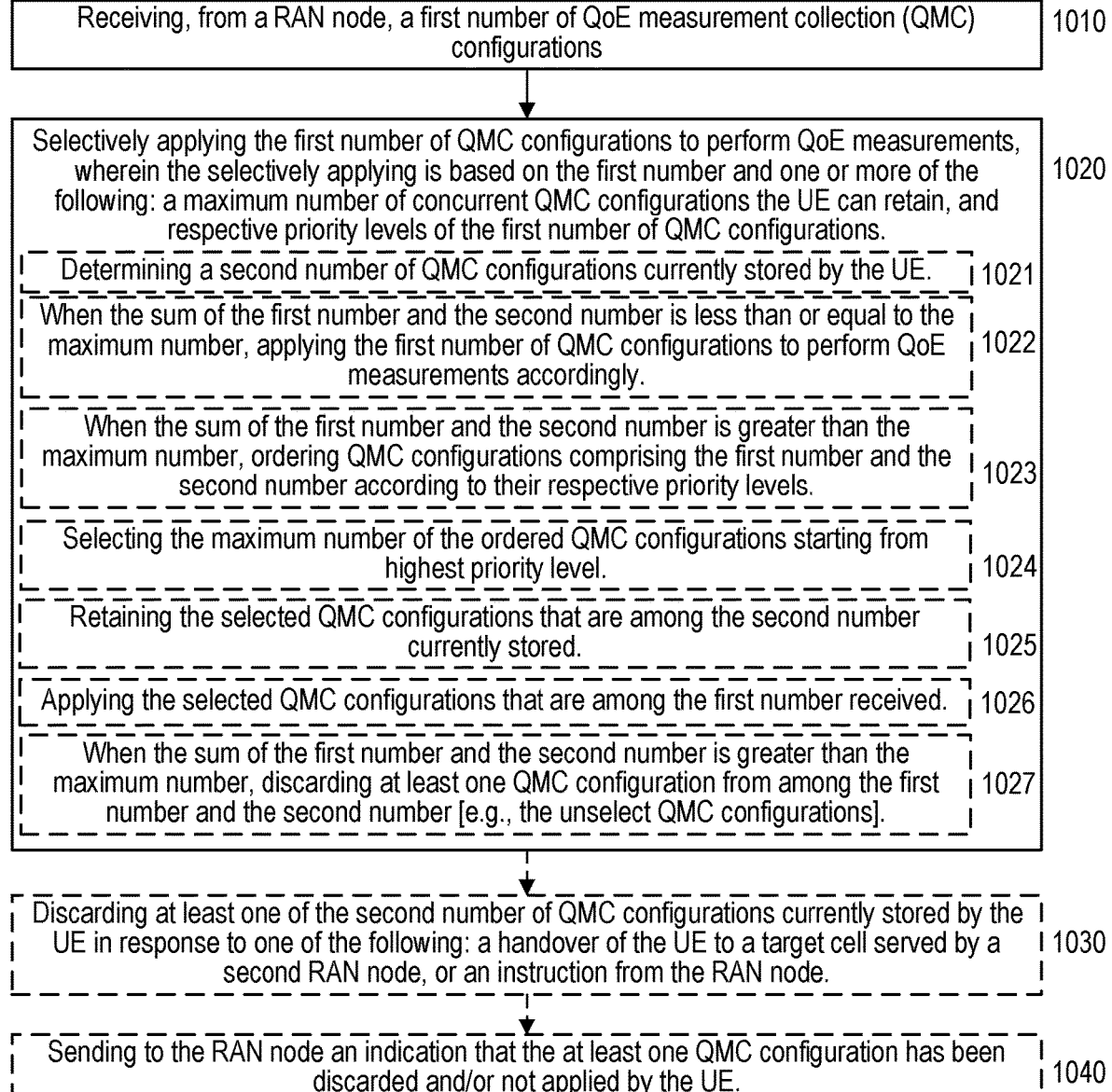

Receiving, from a RAN node, a first number of QoE measurement collection (QMC) configurations    1010

Selectively applying the first number of QMC configurations to perform QoE measurements, wherein the selectively applying is based on the first number and one or more of the following: a maximum number of concurrent QMC configurations the UE can retain, and respective priority levels of the first number of QMC configurations.    1020

Determining a second number of QMC configurations currently stored by the UE.    1021

When the sum of the first number and the second number is less than or equal to the maximum number, applying the first number of QMC configurations to perform QoE measurements accordingly.    1022

When the sum of the first number and the second number is greater than the maximum number, ordering QMC configurations comprising the first number and the second number according to their respective priority levels.    1023

Selecting the maximum number of the ordered QMC configurations starting from highest priority level.    1024

Retaining the selected QMC configurations that are among the second number currently stored.    1025

Applying the selected QMC configurations that are among the first number received.    1026

When the sum of the first number and the second number is greater than the maximum number, discarding at least one QMC configuration from among the first number and the second number [e.g., the unselect QMC configurations].    1027

Discarding at least one of the second number of QMC configurations currently stored by the UE in response to one of the following: a handover of the UE to a target cell served by a second RAN node, or an instruction from the RAN node.    1030

Sending to the RAN node an indication that the at least one QMC configuration has been discarded and/or not applied by the UE.    1040

FIG. 10

HANDLING QUALITY-OF-EXPERIENCE (QOE) CONFIGURATIONS EXCEEDING MAXIMUM NUMBER

TECHNICAL FIELD

The present disclosure generally relates to wireless communication networks, and more specifically to how a user equipment (UE) manages configurations for application-layer (e.g., quality-of-experience, QoE) measurements in a radio access network (RAN), such as when the total number of configurations provided to the UE exceeds a maximum supported by the UE.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases.

Application-layer quality of experience (QoE) measurements were specified for user equipment (UEs) operating in fourth generation Long Term Evolution (LTE) and third generation UMTS networks, and are being specified in 3GPP for UEs operation in NR networks. Measurements in these networks operate according to common high-level principles, with the purpose of measuring the experience of end users when using certain applications over the network. For example, QoE measurements for streaming services and for MTSI (Mobility Telephony Service for IMS) are supported in LTE. QoE measurements will also be needed for UEs operating in NR networks.

A study item for "Study on NR QoE management and optimizations for diverse services" has been approved for NR Rel-16. The purpose is to study solutions for QoE measurements in NR, not only for streaming services as in LTE but also for other services such as augmented or virtual reality (AR/VR), URLLC, etc. Based on requirements of the various services, the NR study will also include more adaptive QoE management schemes that enable intelligent network optimization to satisfy user experience for diverse services.

Similar to LTE, UE QoE measurements made in the 5G radio access network (i.e., NG-RAN) may be initiated by a management function (e.g., OAM) in a generic way for a group of UEs, or they may be initiated by the core network (e.g., 5GC) towards a specific UE based on signaling with the NG-RAN. These two approaches are often referred to as signaling-based QoE and management-based QoE, respectively. For NR QoE in particular, these two approaches are often referred to as signaling-based activation of QoE measurement collection (QMC) and management-based activation of QMC, respectively.

Radio resource control (RRC) signaling is used to configure QoE measurements in UEs and to collect QoE measurement result files from configured UEs. In particular, a QMC configuration from a core network (e.g., EPC, 5GC) or a network operations/administration/maintenance (OAM) function is encapsulated in a transparent container and sent to a UE's serving base station (e.g., eNB, gNB), which forwards it to a UE in an RRC message. QoE measurements made by the UE are encapsulated in a transparent container and sent to the serving base station in an RRC message. The serving base station then forwards the container to a Trace Collector Entity (TCE) or a Measurement Collection Entity (MCE) associated with the CN.

A QMC configuration includes measurement details that are encapsulated in a container that is transparent to the NG-RAN. An NG-RAN node may receive multiple management-based or signaling-based QMC configurations, respectively, from OAM or 5GC.

SUMMARY

An NG-RAN node can also configure a UE with multiple QMC configurations, each pertaining to a specific service type. Currently, there are some rules for how a UE handles QMC configurations pertaining to a single service type. For example, when the UE receives a second signaling-based QMC configuration for a service type for which it currently has a valid first management-based QMC configuration, the second configuration may override the first configuration. On the other hand, when the UE receives a second signaling-based QMC configuration for a service type for which it currently has a valid first signaling-based QMC configuration, the second configuration should not override the first configuration.

Additionally, the UE may support a maximum number of QMC configurations, e.g., due to finite amount of memory and/or other relevant resources. Due to the maximum and the rules described above, when the UE reaches the maximum number with all signaling-based QMC configurations, the NG-RAN will no longer be able to configure the UE with new signaling-based QMC configurations. However, no rules and/or techniques for handling this situation have been specified by 3GPP, which may lead to undesirable, non-standard implementations.

Embodiments of the present disclosure provide specific improvements to QoE measurements by UEs in a wireless network, such as by providing, enabling, and/or facilitating solutions to exemplary problems summarized above and described in more detail below.

Embodiments include methods (e.g., procedures) for a RAN node configured to manage QoE measurements by UEs operating in the RAN.

These exemplary methods can include receiving, from a network node or function (NNF), a first number of QMC configurations and identifying a UE to perform QoE measurements according to the first number of QMC configurations. These exemplary methods can also include selectively providing the first number of QMC configurations to the UE, based on the first number and one or more of the following: a maximum number of concurrent QMC configurations the UE can retain, respective priority levels of the first number of QMC configurations, and current signaling load in the RAN.

In some embodiments, selectively providing the first number of QMC configurations to the UE includes the following operations:

determining a second number of QMC configurations currently stored by the UE;

when the sum of the first number and the second number is less than or equal to the maximum number, sending the first number of QMC configurations to the UE; and when the sum of the first number and the second number is greater than the maximum number, storing at least one of the first number of QMC configurations in a context for the UE.

In some of these embodiments, storing at least one of the first number of QMC configurations in a context for the UE includes storing one or more of the following indications in association with each of the at least one stored QMC configurations:

an indication that the QMC configuration has not been sent to the UE; and an indication of the reason why the QMC configuration has not been sent to the UE.

In some variants of these embodiments, these exemplary methods can also include sending, to a second RAN node, a message including the at least one stored QMC configuration and the one or more indications stored in association therewith. For example, the message can be sent to the second RAN node in association with a handover of the UE to a target cell served by the second RAN node.

In other variants of these embodiments, the NNF is a second RAN node that serves a source cell for a UE handover, the RAN node serves a target cell for the UE handover, and the first number of QMC configurations are received from the second RAN node in association with the UE handover. As a further variant, the one or more indications stored in association with each of the at least one stored QMC configurations can be received from the second RAN node.

In some of these embodiments, for each of the first number of QMC configurations, the priority level is indicated by one or more of the following:

an explicit relative priority level, which is one of a plurality of values indicating different priority levels;

one or more parameters of the QMC configuration, from which the priority level can be inferred or determined;

an indication of whether the QMC configuration can be pre-empted or overridden by other QMC configurations;

an indication of whether the QMC configuration can pre-empt or override other QMC configurations; and whether the QMC configuration is a signaling-based QMC configuration or a management-based QMC configuration.

In some variants of these embodiments, when the sum of the first number and the second number is greater than the maximum number, selectively providing the first number of QMC configurations to the UE can also include the following operations:

dividing the first number of QMC configurations into a first portion and a second portion based on the respective priority levels, wherein the sum of the first portion and the second number is less than or equal to the maximum number; and sending the first portion of QMC configurations to the UE. In such case, the second portion is stored in the context for the UE.

In some of these embodiments, these exemplary methods can also include, for each of the at least one QMC configuration stored in the UE context, discarding the stored QMC configuration in response to any of the following:

sending the stored QMC configuration to the UE or to a second RAN node;

storing further QMC configurations for the UE in the UE context, such that the number of stored QMC configurations for the UE exceeds a retention limit associated with the UE; and expiration of a retention duration associated with the QMC configuration or with the UE.

In some of these embodiments, these exemplary methods can also include sending to the NNF an indication that the at least one QMC configuration has been stored by the RAN node and not sent to the UE.

Other embodiments include methods (e.g., procedures) for a UE configured to perform QoE measurements in a RAN.

These exemplary methods can include receiving, from a RAN node, a first number of QMC configurations. These exemplary methods can also include selectively applying the first number of QMC configurations to perform QoE measurements. The selectively applying is based on the first number and one or more of the following: a maximum number of concurrent QMC configurations the UE can retain, and respective priority levels of the first number of QMC configurations.

In some embodiments, selectively applying the first number of QMC configurations to perform QoE measurements comprises:

determining a second number of QMC configurations currently stored by the UE;

when the sum of the first number and the second number is less than or equal to the maximum number, applying the first number of QMC configurations to perform QoE measurements accordingly; and when the sum of the first number and the second number is greater than the maximum number, discarding at least one QMC configuration from among the first number and the second number.

In some of these embodiments, these exemplary methods can also include send to the RAN node an indication that the at least one QMC configuration has been discarded and/or not applied by the UE. In some variants, the RAN node serves a target cell for a UE handover and the first number of QMC configurations are received in association with the UE handover.

In various embodiments, the priority level for each of the first number of QMC configurations can be indicated by one or more of the various characteristics and/or information summarized above in relation to RAN node embodiments.

In some of these embodiments, the second number of QMC configurations currently stored by the UE are associated with respective priority levels. When the sum of the first number and the second number is greater than the maximum number, selectively applying the first number of QMC configurations to perform QoE measurements can also include the following operations:

ordering QMC configurations comprising the first number and the second number according to their respective priority levels;

selecting the maximum number of the ordered QMC configurations starting from highest priority level;

retaining the selected QMC configurations that are among the second number currently stored; and applying the selected QMC configurations that are among the first number received.

In such case, the unselected QMC configurations are discarded.

Other embodiments include UEs (e.g., wireless devices, etc.) and RAN nodes (e.g., base stations, eNBs, gNBs, ng-eNBs, TRPs, etc.) configured to perform operations corresponding to any of the exemplary methods described herein. Other embodiments include non-transitory, computer-readable media storing program instructions that, when executed by processing circuitry, configure such UEs or RAN nodes to perform operations corresponding to any of the exemplary methods described herein.

These and other embodiments described herein can enable a RAN node to maintain important UE QoE measurements even when the UE is not able to perform and/or the RAN node is not able to facilitate these QoE measurements. By storing QMC configurations for such measurements in association with an indication that they were not sent to the UE, a RAN node can later send such QMC configurations to a UE when it becomes capable of performing, or to another RAN node if the UE is handed over before becoming capable. Based on such indications, the other RAN node can perform similar operations with respect to the received QMC configurations. Thus, the postponed status of QoE measurements can be maintained during UE mobility in the RAN, until the UE can perform the postponed QoE measurements. At a high level, embodiments facilitate QoE measurements that improve QoE for end users of various services.

These and other objects, features, and advantages of embodiments of the present disclosure will become apparent upon reading the following Detailed Description in view of the Drawings briefly described below.

BRIEF DESCRIPTION OF THE DRAWINGS

FIG. 3 shows an exemplary configuration of NR user plane (UP) and control plane (CP) protocol stacks.

FIGS. 4A-C illustrate various aspects of QoE measurement configuration for a UE in an LTE network.

FIG. 9 shows a flow diagram of an exemplary method (e.g., procedure) for a RAN node, according to various embodiments of the present disclosure.

FIG. 10 shows a flow diagram of an exemplary method (e.g., procedure) for a UE, according to various embodiments of the present disclosure.

DETAILED DESCRIPTION

Figure 1:
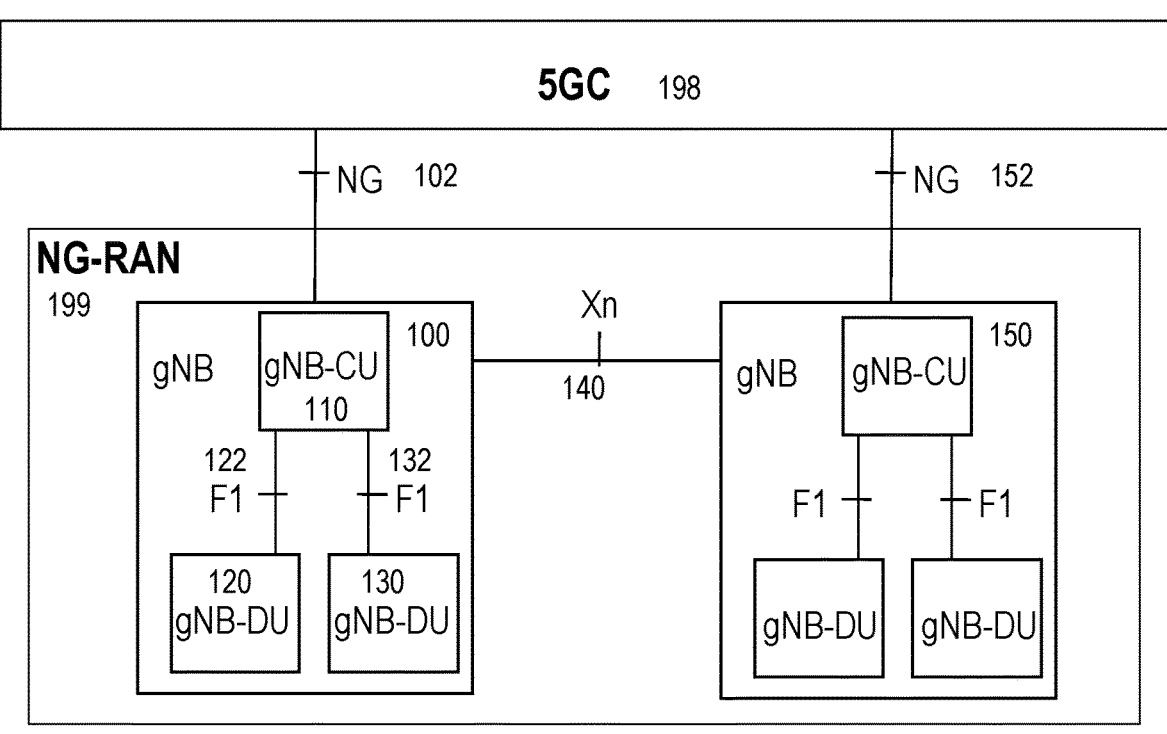
FIGS. 1-2 illustrate two high-level views of an exemplary 5G/NR network architecture.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided as examples to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point (TP), a transmission reception point (TRP), a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a PDN Gateway (P-GW), a Policy and Charging Rules Function (PCRF), an access and mobility management function (AMF), a session management function (SMF), a user plane function (UPF), a Charging Function (CHF), a Policy Control Function (PCF), an Authentication Server Function (AUSF), a location management function (LMF), or the like.

Wireless Device: As used herein, a "wireless device" (or "WD" for short) is any type of device that is capable, configured, arranged and/or operable to communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with the term "user equipment" (or "UE" for short), with both of these terms having a different meaning than the term "network node".

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Base station: As used herein, a "base station" may comprise a physical or a logical node transmitting or controlling the transmission of radio signals, e.g., eNB, gNB, ng-eNB, en-gNB, centralized unit (CU)/distributed unit (DU), transmitting radio network node, transmission point (TP), transmission reception point (TRP), remote radio head (RRH), remote radio unit (RRU), Distributed Antenna System (DAS), relay, etc.

The above definitions are not meant to be exclusive. In other words, various ones of the above terms may be explained and/or described elsewhere in the present disclosure using the same or similar terminology. Nevertheless, to the extent that such other explanations and/or descriptions conflict with the above definitions, the above definitions should control.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

FIG. 1 illustrates an exemplary high-level view of the 5G network architecture, consisting of a Next Generation RAN (NG-RAN) 199 and a 5G Core (5GC) 198. NG-RAN 199 can include a set of gNodeB's (gNBs) connected to the 5GC via one or more NG interfaces, such as gNBs 100, 150 connected via interfaces 102, 152, respectively. In addition, the gNBs can be connected to each other via one or more Xn interfaces, such as Xn interface 140 between gNBs 100 and 150. With respect the NR interface to UEs, each of the gNBs can support frequency division duplexing (FDD), time division duplexing (TDD), or a combination thereof.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport.

The NG RAN logical nodes shown in FIG. 1 include a central (or centralized) unit (CU or gNB-CU) and one or more distributed (or decentralized) units (DU or gNB-DU). For example, gNB 100 includes gNB-CU 110 and gNB-DUs 120 and 130. CUs are logical nodes that host higher-layer protocols and perform various gNB functions such controlling the operation of DUs. DUs are logical nodes that host lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry.

A gNB-CU connects to gNB-DUs over respective F1 logical interfaces, such as interfaces 122 and 132 shown in FIG. 1. The gNB-CU and connected gNB-DUs are only visible to other gNBs and the 5GC as a gNB. In other words, the F1 interface is not visible beyond gNB-CU.

Figure 2:
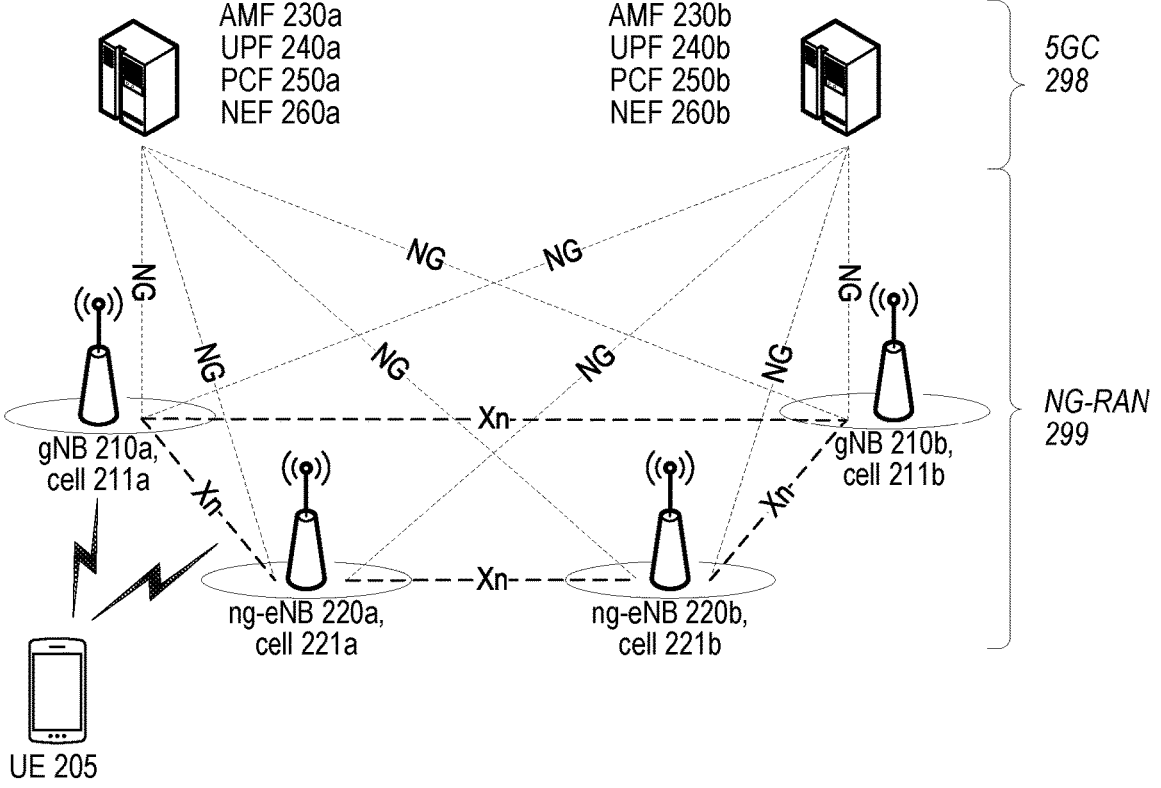

FIG. 2 shows another high-level view of an exemplary 5G network architecture, including NG-RAN 299 and 5GC 298. As shown in the figure, NG-RAN 299 can include gNBs (e.g., 210a,b) and ng-eNBs (e.g., 220a,b) that are interconnected with each other via respective Xn interfaces. The gNBs and ng-eNBs are also connected via the NG interfaces to the 5GC, more specifically to the access and mobility management functions (AMFs, e.g., 230a,b) via respective NG-C interfaces and to the user plane functions (UPFs, e.g., 240a,b) via respective NG-U interfaces. Moreover, the AMFs can communicate with one or more policy control functions (PCFs, e.g., 250a,b) and network exposure functions (NEFs, e.g., 260a,b).

Each of the gNBs can support the NR radio interface including FDD, TDD, or a combination thereof. Each of ng-eNBs can support the fourth generation (4G) Long-Term Evolution (LTE) radio interface. Unlike conventional LTE eNBs, however, ng-eNBs connect to the 5GC via the NG interface. Each of the gNBs and ng-eNBs can serve a geographic coverage area including one more cells, such as cells 211a-b and 221a-b shown in FIG. 2. Depending on the cell in which it is located, a UE (205) can communicate with the gNB or ng-eNB serving that cell via the NR or LTE radio interface, respectively. Although FIG. 2 shows gNBs and ng-eNBs separately, it is also possible that a single NG-RAN node provides both types of functionality.

In addition to providing coverage via cells as in LTE, NR networks also provide coverage via "beams." In general, a downlink (DL, i.e., network to UE) "beam" is a coverage area of a network-transmitted reference signal (RS) that may be measured or monitored by a UE. In NR, for example, RS can include any of the following: synchronization signal/PBCH block (SSB), channel state information RS (CSI-RS), tertiary reference signals (or any other sync signal), positioning RS (PRS), demodulation RS (DMRS), phase-tracking reference signals (PTRS), etc. In general, SSB is available to all UEs regardless of the state of their connection with the network, while other RS (e.g., CSI-RS, DM-RS, PTRS) are associated with specific UEs that have a network connection.

FIG. 3 shows an exemplary configuration of NR user plane (UP) or control plane (CP) protocol stacks between a UE, a gNB, and an AMF. Physical (PHY), Medium Access Control (MAC), Radio Link Control (RLC), and Packet Data Convergence Protocol (PDCP) layers between the UE and the gNB are common to UP and CP. The PDCP layer provides ciphering/deciphering, integrity protection, sequence numbering, reordering, and duplicate detection for both CP and UP. In addition, PDCP provides header compression and retransmission for UP data.

On the UP side, Internet protocol (IP) packets arrive to the PDCP layer as service data units (SDUs), and PDCP creates protocol data units (PDUs) to deliver to RLC. The Service Data Adaptation Protocol (SDAP) layer handles quality-of-service (QOS) including mapping between QoS flows and Data Radio Bearers (DRBs) and marking QoS flow identifiers (QFI) in UL and DL packets. The RLC layer transfers PDCP PDUs to the MAC through logical channels (LCH). RLC provides error detection/correction, concatenation, segmentation/reassembly, sequence numbering, reordering of data transferred to/from the upper layers. The MAC layer provides mapping between LCHs and PHY transport channels, LCH prioritization, multiplexing into or demultiplexing from transport blocks (TBs), hybrid ARQ (HARQ) error correction, and dynamic scheduling (on gNB side). The PHY layer provides transport channel services to the MAC layer and handles transfer over the NR radio interface, e.g., via modulation, coding, antenna mapping, and beam forming.

On CP side, the non-access stratum (NAS) layer is between UE and AMF and handles UE/gNB authentication, mobility management, and security control. The RRC layer sits below NAS in the UE but terminates in the gNB rather than the AMF. RRC controls communications between UE and gNB at the radio interface as well as the mobility of a UE between cells in the NG-RAN. RRC also broadcasts system information (SI) and performs establishment, configuration, maintenance, and release of DRBs and Signaling Radio Bearers (SRBs) and used by UEs. Additionally, RRC controls addition, modification, and release of carrier aggregation (CA) and dual-connectivity (DC) configurations for UEs. RRC also performs various security functions such as key management.

After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "DRX On durations"), an RRC_IDLE UE receives SI broadcast in the cell where the UE is camping, performs measurements of neighbor cells to support cell reselection, and monitors a paging channel on PDCCH for pages from 5GC via gNB. An NR UE in RRC_IDLE state is not known to the gNB serving the cell where the UE is camping.

NR RRC also includes an RRC_INACTIVE state in which a UE is known (e.g., via UE context) by the serving gNB. RRC_INACTIVE has some properties similar to a "suspended" condition used in LTE. More specifically, an RRC_INACTIVE UE remains in CM-CONNECTED (i.e., where the UE's 5GC resources are maintained) and can move within a RAN Notification Area (RNA) configured by NG-RAN without notifying the NG-RAN of changes in serving gNBs within the RNA. In RRC_INACTIVE, the last serving gNB node keeps the UE context and the UE-associated NG connection with the UE's serving AMF and UPF.

If the last serving gNB receives DL data for the UE from the UPF while the UE is in RRC_INACTIVE, it pages in the cells corresponding to the RNA and may send XnAP RAN Paging to neighbor gNB(s) if the RNA includes cells of neighbor gNB(s). The same paging takes place when the last serving gNB receives DL UE-associated signaling from the AMF, except a UE Context Release Command message. Upon receiving such a UE Context Release Command message for an RRC_INACTIVE UE, the last serving gNB may page in the cells corresponding to the RNA and may send XnAP RAN Paging to neighbor gNB(s) if the RNA includes cells of neighbor gNB(s), in order to release UE explicitly.

In general, the RNA configured for a UE can a single or multiple cells within the UE's CN registration area. There are several different alternatives on how the RNA can be configured. For example, a UE can be provided an explicit list of one or more cells that constitute the RNA. Alternately, the UE can be provided (at least one) RAN area ID, where a RAN area is a CN Tracking Area or a subset thereof. A RAN area is specified by one RAN area ID, which consists of a tracking area code (TAC) and optionally a RAN area code. Each cell can broadcast one or more RAN area IDs in its SI. The NG-RAN may provide different RNA definitions to different UEs but not one definition to each UE at any given time.

As briefly mentioned above, QoE measurements have been specified for UEs operating in LTE networks and in earlier-generation UMTS networks. Measurements in both networks operate according to the same high-level principles. Their purpose is to measure the experience of end users when using certain applications over a network. For example, QoE measurements for streaming services and for MTSI (Mobility Telephony Service for IMS) are supported in LTE.

QoE measurements may be initiated towards the RAN from an OAM node generically for a group of UEs (e.g., all UEs meeting one or more criteria), or they may also be initiated from the CN to the RAN for a specific UE. The configuration of the measurement includes the measurement details, which is encapsulated in a container that is transparent to RAN.

A "TRACE START" S1AP message is used by the LTE EPC for initiating QoE measurements by a specific UE. This message carries details about the measurement configuration the application should collect in the "Container for application-layer measurement configuration" IE, which transparent to the RAN. This message also includes details needed to reach the TCE to which the measurements should be sent.

FIGS. 4A-C illustrate a procedure between an E-UTRAN and a UE for configuring QoE measurements in an LTE network. FIG. 4A shows an exemplary UE capability transfer procedure used to transfer UE radio access capability information from the UE to E-UTRAN. Initially, the E-UTRAN can send a UECapabilityEnquiry message. The UE can respond with a UECapabilityInformation message that includes a "UE-EUTRA-Capability" IE.

This IE may further include a UE-EUTRA-Capability-v1530 IE, which can be used to indicate whether the UE supports QoE Measurement Collection for streaming services and/or MTSI services. In particular, the UE-EUTRA-Capability-v1530 IE can include a measParameters-v1530 IE containing the information about the UE's measurement support. In some cases, the UE-EUTRA-Capability IE can also include a UE-EUTRA-Capability-v16xy-IE", which can include a qoe-Extensions-r16 field. FIG. 4B shows an exemplary ASN.1 data structure for these various IEs, with the various fields defined in Table 1 below.

TABLE 1

| Field name | Description |
|---|---|
| qoe-MeasReport | Indicates whether the UE supports QoE Measurement Collection for streaming services. |

TABLE 1-continued

| Field name | Description |
|---|---|
| qoe-MTSI-MeasReport | Indicates whether the UE supports QoE Measurement Collection for MTSI services. |
| qoe-Extensions | Indicates whether the UE supports the Rel-16 extensions for QoE Measurement Collection, i.e., support of more than one QoE measurement type at a time and signaling of withinArea, sessionRecordingIndication, qoe-Reference, temporaryStopQoE and restartQoE |
| temporaryStopQoE | Indicates that reporting, but not collection, of QoE measurements shall be temporarily stopped. |
| withinArea | Indicates at handover, for each application-layer measurement, whether the new cell is inside the area for the measurement, i.e., whether the UE is allowed to start new measurements in the cell |
| restartQoE | Indicates that QoE measurements can be reported again after a temporary stop. |

FIG. 4C shows an exemplary ASN.1 data structure for the qoe-Reference parameter mentioned in Table 1 above.

Figure 5:
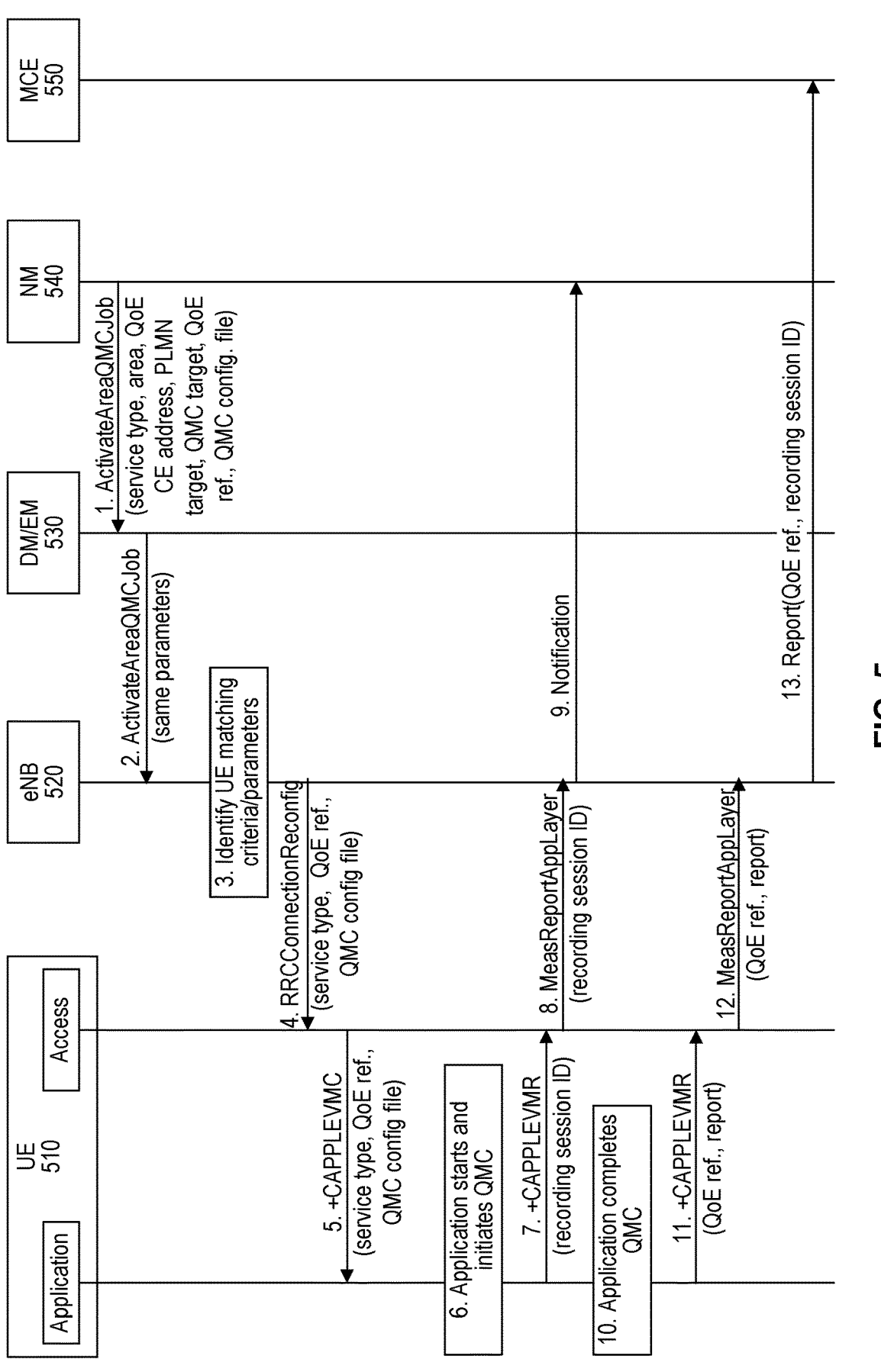
FIG. 5 shows a signaling flow for activation of management-based QoE measurement collection (QMC) in an LTE network.

FIG. 5 shows a signal flow of activation of management-based QoE measurement collection (QMC) and reporting of collected information in an LTE network. This signal flow is between a measurement collection entity (MCE, 550), a network manager (NM, 540), a domain manager (DM/EM, 530), one or more eNBs (520) in E-UTRAN, and the UE (510)—particularly access stratum (or access, for short) and application parts of the UE. The following description omits these reference numbers for brevity. Although the operations shown in FIG. 5 are given numerical labels, these labels are intended to facilitate the following description rather than to require and/or imply a particular order of the operations.

In operation 1, the NM sends an Activate Area QMC Job message to the DM, which forwards to the message to the eNB in operation 2. The message includes a service type (e.g., streaming), a QMC configuration file for the QoE measurements to be performed, a QoE reference identifier, and an area scope for the QMC. According to 3GPP TS 28.405 (v16.1.0) section 5.2, the QoE reference is globally unique and consists of MCC+MNC+QMC ID, where Mobile Country Code (MCC) and Mobile Network Code (MNC) identify the Public Land Mobile Network (PLMN) containing the NM. QMC ID is a three-octet string generated by the NM or the operator, and identifies the particular QMC job in the traffic nodes and the MCE.

In operation 3, the eNB identifies served cells matching the area scope, as well as UEs in these served cells that match other parameters in the message (e.g., service type). The eNB can base this determination on UE capability information sent from the UE to the eNB (not shown). In operation 4, after identifying the UE matching the received criteria, the eNB sends an RRCConnectionReconfiguration message to the AS (e.g., RRC layer) of the UE. The eNB includes the service type, the area scope (e.g., one or more cells, tracking areas, etc.), the QMC configuration file, and the QoE reference.

In operation 5, the UE AS forwards this information to the UE application part using an AT command +CAPPLEVMC, as specified in 3GPP TS 27.007. In general, AT commands can be used to transfer information between different layers in the UE, such as between application and AS. In particular, AT command +CAPPLEVMC is of the following form when used for QoE measurement configuration:

+CAPPLEVMC:    <app-meas_service_type>,<start-stop_reporting>[,<app-meas_config_file_length>,<app-meas_config-file>], where the various fields are defined below:
    <n>: integer type. Disable and enable presentation of the unsolicited result code +CAPPLEVMC to the TE.
      0 Disable presentation of the unsolicited result code
      1 Enable presentation of the unsolicited result code
    <app-meas_service_type>: integer type. Contains the indication of what application that is target for the application level measurement configuration.
      1 QoE measurement collection for streaming services
      2 QoE measurement collection for MTSI services
    <start-stop_reporting>: integer type. Indicates the start and stop of the application level measurement reporting for the application indicated by the <app-meas_service_type>.
      0 start the application level measurement reporting
      1 stop the application level measurement reporting
    <app-meas_config_file_length>: integer type. Indicates the number of octets of the <app-meas_config-file> parameter.
    <app-meas_config-file>: string of octets. Contains the application level measurement configuration file for the application indicated by the <app-meas_service_type>. The parameter shall not be subject to conventional character conversion as per +CSCS.

In operation 6, the UE starts an application associated with the service type and initiates QMC according to the received configuration and area. The UE assigns this QMC a recording session ID and reports this ID (in operation 7) to the UE AS using the same AT command. In operation 8, the UE AS sends this ID to the eNB in a MeasReportAppLayer RRC message, and the eNB notifies the NM of the initiation of QMC in operation 9.

The UE application layer completes the QMC according to the received configuration (operation 10) and reports the results to the UE AS via AT command +CAPPLEVMR (operation 11) along with the associated QoE reference received earlier. The report can be a transparent container, as discussed earlier. AT command +CAPPLEVMC is of the following form when used for QoE measurement reporting:
    +CAPPLEVMC=<app-meas_service_type>,<app-meas_report_length>,<app-meas_report> where the various fields are defined below:
      <app_meas_service_type>: integer type. Contains the indication of what application that is providing the application level measurement report.
        1 QoE measurement collection for streaming services
        2 QoE measurement collection for MTSI services <app-meas_report_length>: integer type. Indicates the number of octets of the <app-meas_report> parameter.

<app-meas_report>: string of octets. Contains the application level measurement configuration file for the application indicated by the <app-meas_service_type>. The parameter shall not be subject to conventional character conversion as per +CSCS.

In operation 12, the UE AS sends the report and the QoE reference ID to the eNB in a MeasReportAppLayer RRC message. The eNB subsequently forwards the report to the MCE (operation 13). In some cases, the MCE may forward the QoE measurement report another entity in the network for analysis and further action (e.g., in the OAM system).

Figure 6:
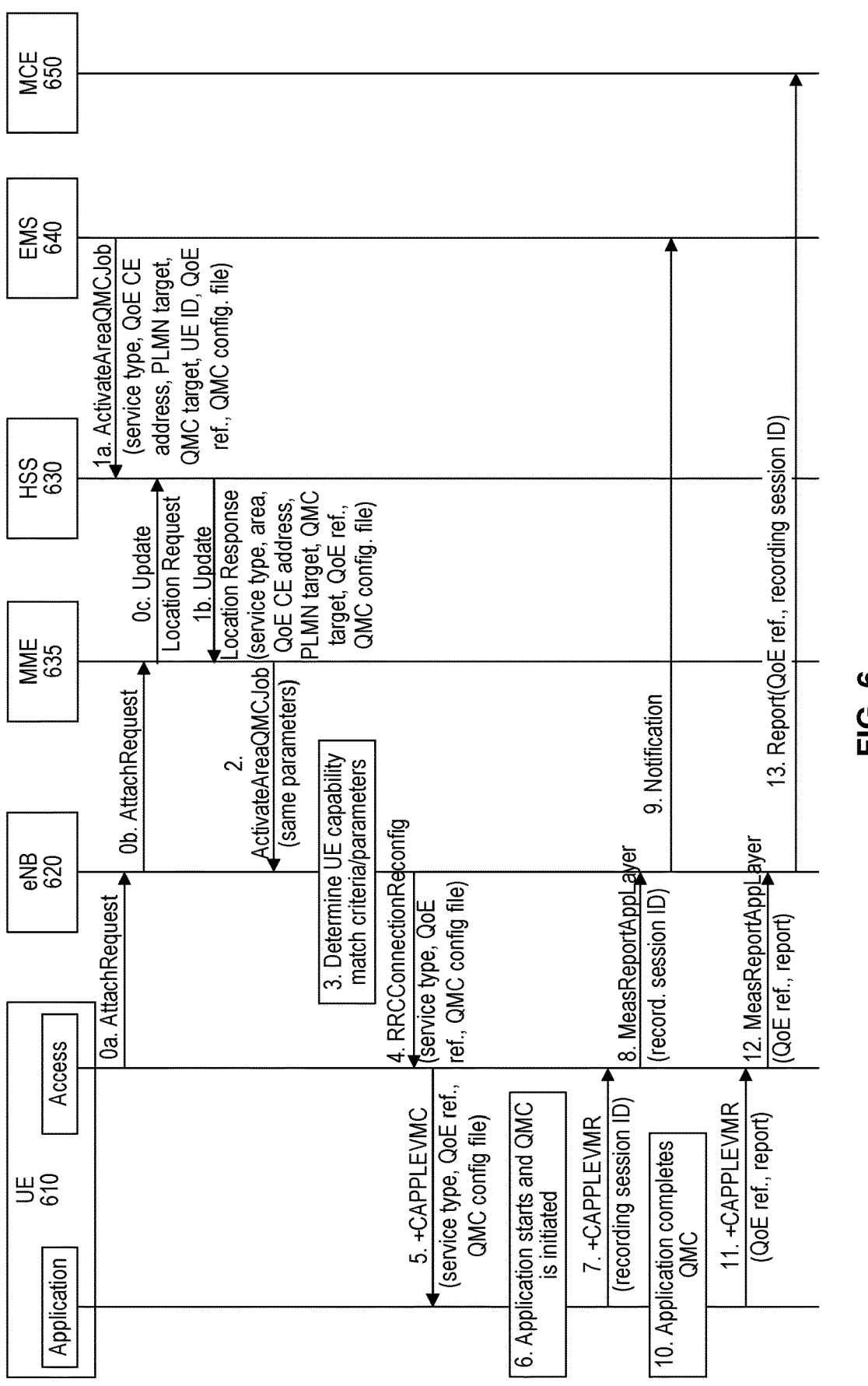
FIGS. 6-7 show signaling flows for activation of signaling-based QMC in an LTE network, before and after UE attachment to the LTE network, respectively.

FIG. 6 shows a signal flow of activation of signaling-based QMC for a specific UE before the UE attaches to the LTE network. This signal flow is between a measurement collection entity (MCE, 650), a network manager (EMS, 640), a home subscriber server (HSS, 630), a mobility management entity (MME, 635), one or more eNBs (620) in E-UTRAN, and the UE (610)—particularly access stratum (or access, for short) and application parts of the UE. The following description omits these reference numbers for brevity. Although the operations shown in FIG. 6 are given numerical labels, these labels are intended to facilitate the following description rather than to require and/or imply a particular order of the operations.

In operations 0a-b, the UE sends an attach request to its serving eNB, which forwards the attach request to the MME. In operation 0c, the MME sends an Update Location Request to the HSS to update the UE's location information.

In operation 1a, the EMS sends an Activate Area QMC Job message to the HSS. The message includes a service type (e.g., streaming), a QMC configuration file for the QoE measurements to be performed, a QoE reference identifier, and an identifier of the UE from which measurements are requested. In general, the contents of the Activate Area QMC Job message are the same as the corresponding message in FIG. 5, except for exclusion of the area scope and inclusion of the UE identifier.

In operation 1b, the HSS sends an Update Location Response to the MME (i.e., in response to the Update Location Request) and includes the contents of the message received in operation 1a. The MME forwards the message to the eNB in operation 2. In operation 3, the eNB determines whether the UE's capabilities match the criteria and/or parameters for QMC that were included in the message of operation 2. The eNB can base this determination on UE capability information sent from the UE to the eNB (not shown).

If the UE's capabilities are sufficient for the requested QMC, the eNB sends an RRCConnectionReconfiguration message to the AS (e.g., RRC layer) of the UE in operation 4. The eNB includes the service type, the area scope (e.g., one or more cells, tracking areas, etc.), the QMC configuration file, and the QoE reference. Operations 5-13 proceed in the same manner as corresponding operations in FIG. 5.

Figure 7:
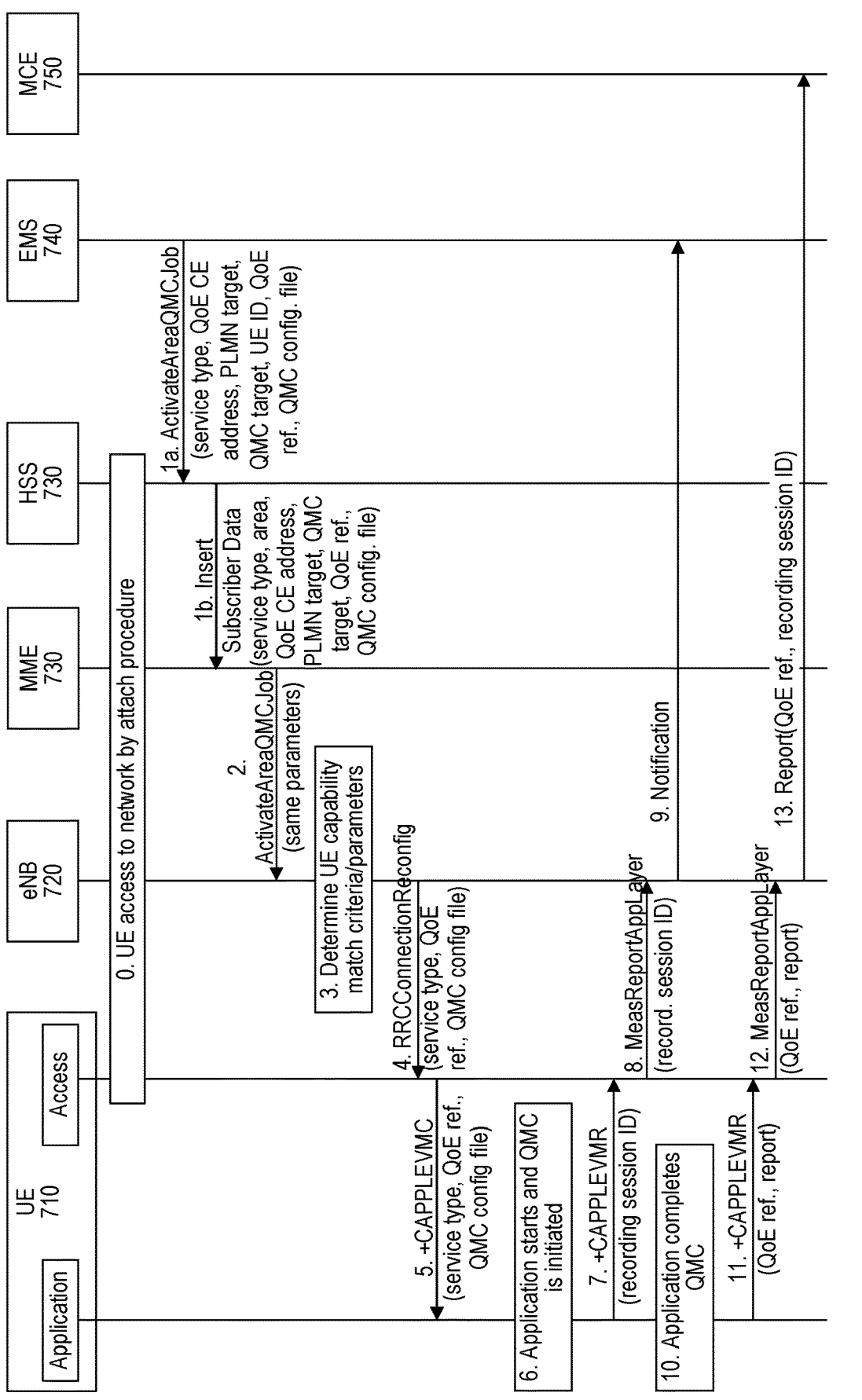

FIG. 7 shows a signal flow of activation of signaling-based QMC for a specific UE after the UE attaches to the LTE network. This signal flow is between a measurement collection entity (MCE, 750), a network manager (EMS, 740), a home subscriber server (HSS, 730), a mobility management entity (MME, 535), one or more eNBs (720) in E-UTRAN, and the UE (710)—particularly access stratum (or access, for short) and application parts of the UE. The following description omits these reference numbers for brevity. Although the operations shown in FIG. 7 are given numerical labels, these labels are intended to facilitate the following description rather than to require and/or imply a particular order of the operations.

In operation 0, which can be considered a prerequisite, the UE attaches to the LTE network via a customary attach procedure. In operation 1a, the EMS sends an Activate Area QMC Job message to the HSS. The message includes a service type (e.g., streaming), a QMC configuration file for the QoE measurements to be performed, a QoE reference identifier, and an identifier of the UE from which measurements are requested. In general, the contents of the Activate Area QMC Job message are the same as the corresponding message in FIG. 5, except for exclusion of the area scope and inclusion of the UE identifier. Also, the contents of the Activate Area QMC Job message are the same as corresponding message in FIG. 6.

In operation 1b, the HSS inserts or appends subscriber data to the Activate Area QMC Job message and forwards it to the MME. Operations 2-13 proceed in the same manner as corresponding operations in FIG. 6.

NR Rel-16 includes a study on NR QoE management and optimizations for diverse services, with a purpose to study solutions for QoE measurements in NR, not only for streaming services as in LTE but also for other services such as augmented or virtual reality (AR/VR), URLLC, etc. Based on requirements of the various services, the NR study will also include more adaptive QoE management schemes that enable intelligent network optimization to satisfy user experience for diverse services.

Similar to LTE, UE QoE measurements made in NG-RAN may be activated by a network management function (e.g., OAM) in a generic way for a group of UEs, or by a 5GC node (e.g., AMF) towards a specific UE based on signaling with the NG-RAN. Similar to LTE, these two options are referred to as management-based QMC activation (or management-based QoE) and signaling-based QMC activation (or signaling-based QoE).

In addition to conventional or legacy QoE metrics, 3GPP has introduced so-called "RAN-visible" (or RV, for short) QoE metrics and QoE values. For example, RVQoE measurements are supported for DASH streaming and virtual reality (VR) services. In general, RVQoE metrics are a subset of legacy QoE metrics collected from UE and RVQoE values are derived from legacy QoE metrics through a model and/or function. Both types are RAN-visible because they are useful (in some way) to the NG-RAN. A general description of RVQoE measurements and related procedures is given in 3GPP TS 38.300 (v17.0.0) section 21.4.

QoE measurements are configured by an NG-RAN node, with the RVQoE subset being reported by the UE as an explicit IE that is readable by the NG-RAN node. RVQoE measurements or metrics could be utilized by the NG-RAN node for network optimization. The PDU session ID(s) corresponding to the service that is subject to QoE measurements can also be reported by the UE along with the RAN visible QoE measurement results.

An NG-RAN node may receive multiple QMC configurations associated with different QoE references, including for management-based QoE and/or for signaling-based QoE. Furthermore, an NG-RAN node can configure an individual UE with multiple QMC configurations associated with different QoE references, e.g., for different service types. Moreover, there is nothing preventing an NG-RAN node from configuring an individual UE with multiple QMC configurations associated with different QoE references, but for the same service type.

Even so, it is unclear how the UE should behave when the NG-RAN node provides a second QMC configuration for a service type after a first QMC configuration for that service type is activated. For example, it is unclear whether a second signaling based QMC configuration for a service type should override the UE's existing first management based QMC configuration for that service type. Similarly, it is unclear whether a second signaling based QMC configuration for a service type should override the UE's existing first signaling based QMC configuration for that service type.

Furthermore, it is unclear whether the same or different rules should apply in those two situations. Consider as an example, however, the rule that a management based QMC configuration should not override an existing signaling based QMC configuration, while a signaling based QMC configuration can override an existing management based QMC configuration. Also, consider the case where a UE can retain a maximum number of QMC configurations concurrently; once it reaches this maximum number, the UE can accept no additional QMC configurations. Thus, when UE is configured with the maximum number of signaling based QMC configurations, it will not be possible for the serving NG-RAN node to provide the UE a new signaling based QMC configuration from the 5GC. However, it is unclear how the NG-RAN node should handle this net signaling based QMC configuration that the UE is currently unable to accept.

Accordingly, embodiments of the present disclosure provide flexible and efficient techniques whereby a RAN node can manage QMC configurations intended for served UEs, which may be already configured with (or nearly) the maximum number of concurrent QMC configurations. At a high level, the RAN node can receive one or more QMC configurations from a network node or function (NNF, e.g., another RAN node, CN node such as AMF, SMO, OAM, etc.). The RAN node can determine whether to provide the one or more QMC configurations to the UE, e.g., based on the UE's currently stored QMC configurations relative to the maximum number, QMC configuration priority levels, etc. Upon determining not to provide at least one of the QMC configurations, the RAN node can store these in association with other UE information, e.g., in a UE context. The RAN node can also store (e.g., in the UE context) an indication that the QMC configuration(s) were not sent to the UE. Subsequently, the RAN node can discard the stored QMC configuration(s) upon one of various events, such as sending to the UE or to a second RAN node, or upon reaching a retention limit (e.g., number of QMC configurations stored for the UE) or expiration of a retention duration.

Certain embodiments may provide one or more of the following technical advantage(s). Embodiments can enable a RAN node to maintain important UE QoE measurements even when the UE is not able to perform and/or the RAN node is not able to facilitate these QoE measurements. By storing QMC configurations for these measurements in association with an indication that they were not sent to the UE, a RAN node can later send such QMC configurations to a UE when it becomes capable of performing, or to another RAN node if the UE is handed over before becoming capable. Based on such indications, the other RAN node can perform similar operations with respect to the received QMC configurations. Thus, the postponed status of QoE measurements can be maintained during UE mobility in the RAN, until the UE can perform the postponed QoE measurements. At a high level, embodiments can facilitate QoE measurements that improve QoE for end users of various services.

In the following description of various embodiments, the following groups of terms and/or abbreviations have the same or substantially similar meanings and, as such, are used interchangeably and/or synonymously unless specifically noted or unless a different meaning is clear from a specific context of use:

- "application layer" and "UE application layer" (RAN nodes generally do not have an application layer);
- "application-layer measurement", "application measurement", and "QoE measurement";
- "conventional QoE measurement", "legacy QoE measurement", and "non-RAN-visible QoE measurement";
- "QoE measurement report", "QoE report", "measurement report", and "report";
- "QoE measurement configuration", "QoE configuration", "QMC configuration";
- "modem", "radio layer", "radio network layer", and "access stratum";
- "radio layer connection" and "RRC connection";
- "UE RRC configuration", "RRC configuration", "UE RRC context", "RRC context", "context";
- "service" and "application";
- "measurement collection entity", "MCE", "trace collection entity", and "TCE".

Figure 8:
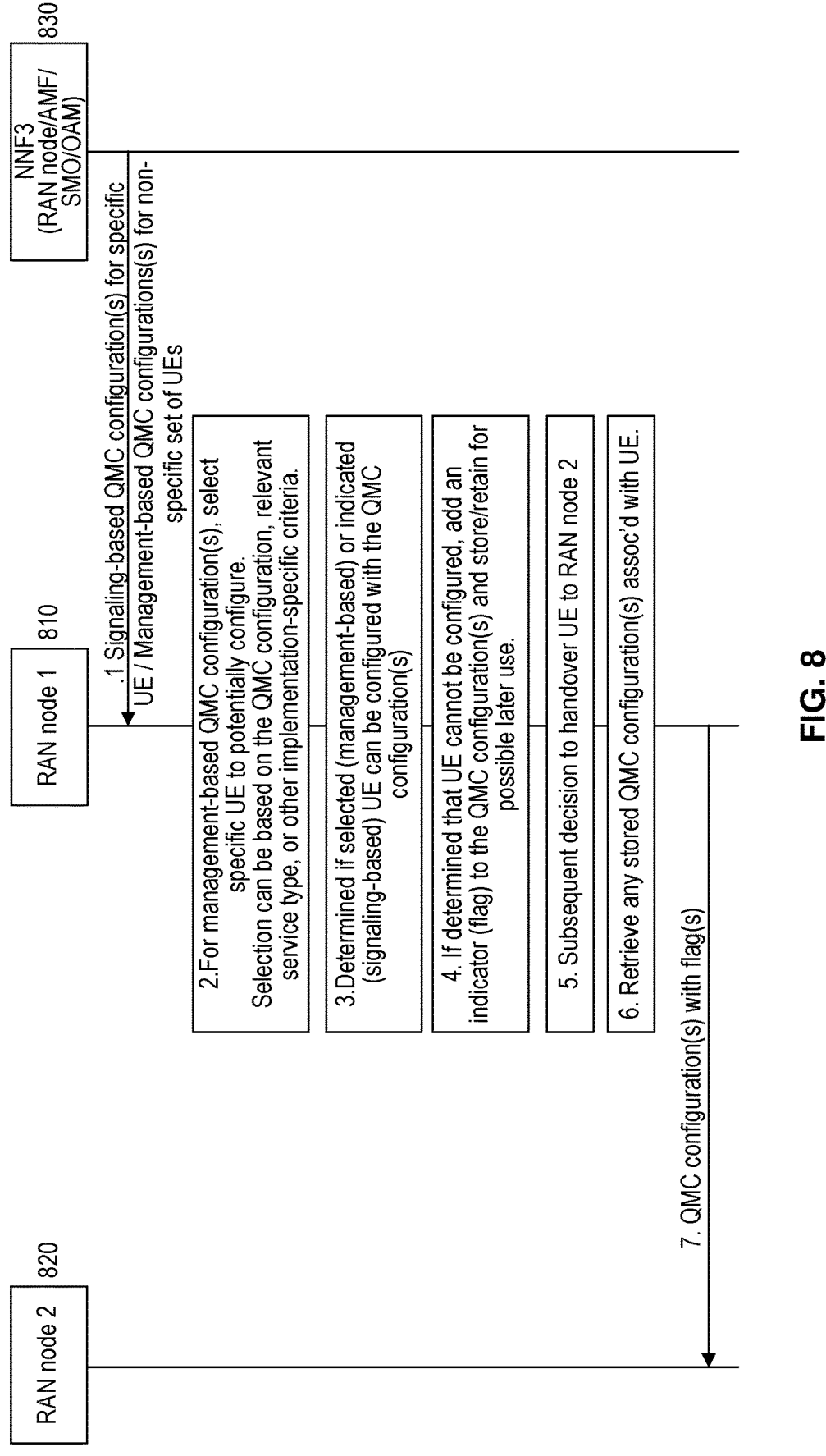
FIG. 8 is a diagram of signaling between a UE, first and second RAN nodes, and a network node or function (NNF), according to various embodiments of the present disclosure.

FIG. 8 shows a signaling diagram between a first RAN node (810), a second RAN node (820), and a third network node or function (NNF3, 830), according to some embodiments of the present disclosure. Although FIG. 8 shows operations with numerical labels, the numbers are intended to facilitate the following description rather than to require and/or imply any particular order of the operations, unless expressly stated to the contrary.

In operation 1, the first RAN node receives a QMC configuration from NNF3. In case the QMC configuration is signaling-based, NNF3 can be a CN node such as AMF in 5GC or MME in EPC. In case the QMC configuration is management-based, NNF3 can be a network management function, such as service management and orchestration (SMO) or operations, administration, and maintenance (OAM). In various embodiments, the QMC configuration may be sent/received together with associated information (e.g., service type, area scope, UE identifier, etc.) customarily included with QMC activation, such as described in relation to FIGS. 5-7.

In operation 2, when the QMC configuration is management-based, the first RAN node selects one or more served UEs based on the QMC configuration, service type, and UE-specific capabilities. When the QMC configuration is signaling-based, UE selection is trivial based on the indicated UE identifier.

In operation 3, the first RAN node determines whether to send the QMC configuration to the selected UE(s), based on whether the UE can accept the QMC configuration and/or whether it is desirable to provide the send the QMC configuration to the UE(s). For example, the first RAN node can determine that the UE cannot accept the QMC configuration because it currently maintains a maximum number of QMC configurations, none of which can be overwritten by a new QMC configuration (e.g., because none of them are management-based).

In operation 4, when it was determined not to send the QMC configuration to the UE, the first RAN node maintains the QMC configuration together with other local information about the UE. For example, the first RAN node can add the QMC configuration to a UE context stored in memory associated with (e.g., local to) the first RAN node.

In some embodiments, the first RAN node can store an indicator (e.g., flag) together with the QMC configuration. When stored in this manner, the indicator indicates that the QMC configuration has not been sent to the UE. In some variants, the indicator may also indicate that the QMC configuration was received from NNF3.

Although not shown in FIG. 8, in case the first RAN node is later able to send the QMC configuration to the UE, the first RAN node clears the indicator and/or discards the QMC configuration (e.g., deletes from local storage).

Alternately, as shown in FIG. 8, the first RAN node subsequently determines to handover the UE to a target cell served by the second RAN node in operation 5, while the QMC configuration with associated indicator is still being maintained. In operations 6-7, the first RAN node retrieves the QMC configuration and associated indicator and sends them to the second RAN node, e.g., in a HANDOVER REQUEST message. In this manner, the second RAN node becomes aware of the QMC configuration that is still pending for the UE, and can perform operations similar to operations 3-7 by the first RAN node in FIG. 8.

In some embodiments, the first RAN node may also maintain with the QMC configuration an indication of a reason why the QMC configuration has not been sent to the UE. An example reasons is that the UE already is configured with a maximum number of QMC configurations and none of these may be overridden by the new QMC configuration, as discussed above.

In some embodiments, the first RAN node may clear the associated indicator upon sending the QMC configuration to the UE, but if the first RAN node later performs a handover of the UE to the second RAN node, the first RAN node sends the cleared indicator to the second RAN node, e.g., in a HANDOVER REQUEST together with the QMC configuration. In this manner, the second RAN node can discern that the QMC configuration has been provided to the UE being handed over.

In some embodiments, rather than adding an explicit indicator to the QMC configuration, the first RAN node may use some implicit indicator that facilitates the first RAN node to "remember" that the stored QMC configuration has not been sent to the UE. For example, if the first RAN node deletes a QMC configuration after sending it to the UE, an implicit indication could be the presence or absence of a QMC configuration (e.g., an XML file) in the stored UE context. As another example, if the first RAN node does not assign a measConfigAppLayerId to a QMC configuration until it is sent to the UE, an implicit the presence or absence of a measConfigAppLayerId can be an implicit indication. Even if such implicit indication is used by the first RAN node, an explicit indication can be sent to the second RAN node together with the QMC configuration at UE handover.

In some embodiments, if the QMC configuration received in operation 1 is signaling-based, upon determining not to send it to the UE in operation 3, the first RAN node can also inform NNF3 of this determination. For example, the first RAN node can inform NNF3 simply that the QMC configuration was not sent to the UE but is pending in the first RAN node. In some embodiments, the first RAN node can indicate the reason why the QMC configuration was not sent to the UE, such as maximum number of concurrent QMC configurations in the UE, need to reduce signaling in the RAN, etc.

As discussed above, it may be impossible to configure the UE with additional QoE measurements after the UE reaches the maximum number of QMC configurations it can maintain concurrently, and none of these can be overwritten. However, even before the UE reaches the maximum number, the first RAN node may determine that it is not desirable to provide the UE with another QMC configuration. For example, this determination may be based on a need to reduce signaling load in the RAN.

In some embodiments, a signaling-based QMC configuration received by a RAN node may include, or be associated with, a relative priority level. The first RAN node (or the second RAN node) may use the priority level to determine whether the signaling-based QMC configuration can override any of the UE's existing QMC configurations, which may be associated with respective priority levels. In other words, if the signaling-based QMC configuration has a higher priority level than at least one of the UE's existing QMC configurations, the RAN node can determine to send the QMC configuration to the UE because the UE can replace one of its existing QMC configurations with the received QMC configuration. This priority mechanism may be similar to the ARP (Allocation and Retention Priority) parameter used for QoS. For example, the QMC configuration priority level may be indicated by one of a set of integer values (e.g., 1-15), with ascending (or descending) values corresponding to increasing priority level.

In some embodiments, a signaling-based QMC configuration can have one or more attributes or indicators such as "pre-emption vulnerability", which indicates whether the QMC configuration can be released in favor of, or overridden by, another QMC configuration; and "pre-emption capability", which indicates whether the QoE configuration can override (or cause to be released) another QMC configuration.

In some embodiments, a management-based QMC configuration received by a RAN node may include, or be associated with, a relative priority level, by which the RAN node can determine whether it can override other management-based QoE configurations. If multiple QMC configurations are sent concurrently to a RAN node (e.g., in the same message), and all of the multiple QMC configurations cannot be provided to the UE without the UE exceeding its maximum number of concurrent QMC configurations, the RAN node may use the respective priority levels of the received QMC configurations to determine which of the newly received QoE configurations to provide to the UE. For example, the QMC configuration(s) with the highest priority level may be selected, possibly also considering other constraints due to the QoE measurement type (e.g., a management based QMC configuration cannot override a signaling based QMC configuration).

Alternately, the UE rather than the RAN node can make priority-based selections. In some embodiments, the RAN node may send one or more QMC configurations to the UE. If the UE stored these directly, it would cause the UE's total number of QMC configurations to exceed its maximum number of concurrent QMC configurations. Based on the priority levels associated with the respective QMC configurations (which may be provided together with each QMC configuration), the UE selects out of the previously stored and newly received the maximum number of QMC configurations to retain. The UE may store each received (and retained) QMC configuration together with its priority level, e.g., in association with the measConfigAppLayerId that identifies the QMC configuration). The UE Access Stratum (UE AS), which receives the QoE configuration and is associated priority level from the RAN node, may forward the priority level indication to the UE application layer together with the QMC configuration, in a similar manner as illustrated in FIGS. 5-7.

In some embodiments, prioritization may be implicit from other characteristics of QMC configurations, instead of or in addition to the explicit priority level mentioned above. For example, prioritization may be implicit from the service type or the type of application, e.g., based on the application indication. A level of priority and/or a first set of parameters (e.g., a pre-emption capability or a pre-emption vulnerability) used to determine the priority among different QoE configurations, may be unique for one specific QMC configuration or apply to a group of QMC configurations. The group may be determined from a second set of parameters, such as service type, service subtype, NNF that consumes QoE measurements, NNF that prepares the QMC configuration(s), area scope, range of QoE Reference IDs, S-NS-SAI, RAT, QOS parameters in a QoS profile (e.g., Guaranteed Flow Bit Rate in UL/DL or Maximum Packet Loss Rate in UL/DL), Time Sensitive Network (TSN) QoS-related attribute (e.g., traffic class, TSC Burst Size, etc.).

In some embodiments when a RAN node determines that a UE's maximum number of concurrent QMC configurations is reached, it may select at least one additional QMC configuration that is ready to be applied to the UE and retain it until at least one of the UE's ongoing QMC sessions has ended (e.g., until receiving a Session Stop indication, a QoE report associated with the complete session, or until receiving the QoE report related to the session end). The number of QMC configurations a RAN node retains for a UE, and/or the retention duration of each, may depend upon various criteria. By way of example, the retention duration and/or the number of QoE configurations to retain may depend on a priority level, a service type, a service subtype, an S-NS-SAI, QoE measurement type (management-based or signaling based), whether RAN visible QoE is desirable or not, whether alignment with MDT is required or not, or a combination thereof.

In some embodiments, a first RAN node may inform another network node (e.g., second RAN node, a CN node or function, OAM, SMO, MCE, or another network function with the responsibility to control and coordinate the number of concurrently configured/active QoE measurement, their type and associated configuration parameters) about the status of a QMC configuration that the first RAN node received, e.g., whether the QMC configuration has been applied, retained, pre-empted (optionally indicating reason for pre-emption and pre-emptying QMC configuration), etc.

In some embodiments, the first RAN node or a second RAN node (e.g., serving a target cell for UE mobility) may receive at least one policy from NNF3 or another NNF (e.g., CN, OAM, SMO, another RAN node, an ORAN Real-Time or Non-Real-Time RAN Intelligent Controller (RIC), etc.). The at least one policy includes or relates to priorities to be used by the RAN node when determining actions related to QMC configurations, e.g., override of a QMC configuration compared to another. The first RAN node or the second RAN node may acknowledge or refuse at least one of the policies received.

In some embodiments, various methods for handling of QMC configurations described above may be applied to QMC configurations for RVQoE measurements. In some embodiments, QMC configurations for RVQoE measurements and for conventional QoE measurements may be treated separately in accordance with the embodiments described above. As an example, the UE may have first and second maximum numbers of concurrent QMC configurations for conventional and RV QoE measurements, respectively. Alternately, the UE may have a single maximum number of concurrent QMC configurations that covers both conventional and RV QoE measurements (i.e., the maximum number applies to any and all QMC configurations).

Embodiments of the present disclosure can be realized as specification text for 3GPP standards. As an example, the QoE measurement configuration IE sent over the XnAP interface between NG-RAN nodes (as specified in 3GPP TS 38.423 v16.7.0) can be modified according to the table below to include a QoE Measurement Status field, which can take one of two enumerated values that include "ongoing" and "receivedAndNotConfigured". This field can correspond to the indication (e.g., flag) discussed in various embodiments above.

| IE/Group Name | Pres. | Range | IE type/ref. | Semantics description |
|---|---|---|---|---|
| QoE Measurement Configuration List | | 0..1 | | |
| >QoE Measurement Configuration Item | | 1 .. <maxnoofQoEMeasConfig> | | |
| >>Service Type | M | | ENUMERATED (QMC for DASH streaming, QMC for MTSI, QMC for VR, . . . ) | This IE indicates the service type of QoE measurements. |
| >>QoE Measurement Type | M | | ENUMERATED (s-based, m-based, . . . ) | |
| >>QoE Measurement Status | M | | ENUMERATED (ongoing, receivedAndNot Configured . . . ) | |
| >>QoE Reference | M | | OCTET STRING (SIZE(6)) | QoE Reference, as defined in clause 5.2 of TS 28.405. It consists of MCC + MNC + QMC ID, where the MCC and MNC are coming with the trace activation request from the management system to identify one PLMN containing the management system, and QMC ID is a 3 bytes Octet String. |

-continued

| IE/Group Name | Pres. | Range | IE type/ref. | Semantics description |
|---|---|---|---|---|
| >>Measurement Configuration Application Layer ID | M | | | This IE indicates the identity of the application layer measurement configuration, as defined in TS 38.331 [10]. |
| >>Alignment With MDT Required | O | | ENUMERATED (true, false . . . ) | |
| >>Measurement Collection Entity IP Address | M | | Transport Layer Address 9.2.3.29 | The IP address of the entity receiving the QoE measurement report. |
| >>Container for QoE measurement configuration | C-ifQoEMeas Type Signaling Based | | OCTET STRING (1..FFS) | Contains the QoE measurement configuration. |
| >>CHOICE Area Scope of QMC | C-ifQoEMeas Type SignalingBased | | | |
| >>>Cell based | | | | |
| >>>>Cell ID List for QMC | | 1 .. <maxnoofCellIDforQMC> | | |
| >>>>>NR-CGI | M | | 9.2.2.7 | |
| >>>TA based | | | | |
| >>>>TA List for QMC | | 1 .. <maxnoofTAforQMC> | | |
| >>>>>TAC | M | | 9.2.2.5 | The TAI is derived using the current serving PLMN. |
| >>>TAI based | | | | |
| >>>>TAI List for QMC | | 1 .. <maxnoofTAforQMC> | | |
| >>>>>TAI | M | | 9.2.3.20 | |
| >>>PLMN based | | | | |
| >>>>PLMN List for QMC | | 1 .. <maxnoofPLMNforQMC> | | |
| >>>>>PLMN Identity | M | | 9.2.2.4 | |
| >>Slice for QMC List | C-ifQoEMeasType Signaling Based | 0..1 | | |
| >>>Slice for QMC Item | | 1 .. <maxnoofPLMNforQMC> | | |
| >>>>PLMN Identity | M | | 9.3.1.14 | |
| >>>>S-NSSAI List | | 1 | | |
| | | 1 .. <maxnoofSNSSAIforQMC> | | |
| >>>>>S-NSSAI | | | S-NSSAI 9.3.1.38 | |

Various features of the embodiments described above correspond to various operations illustrated in FIGS. 9-10, which show exemplary methods (e.g., procedures) for a RAN node and a UE, respectively. In other words, various features of the operations described below correspond to various embodiments described above. Furthermore, the exemplary methods shown in FIGS. 9-10 can be used cooperatively to provide various benefits, advantages, and/or solutions to problems described herein. Although FIGS. 9-10 show specific blocks in particular orders, the operations of the exemplary methods can be performed in different orders than shown and can be combined and/or divided into blocks having different functionality than shown. Optional blocks or operations are indicated by dashed lines.

In particular, FIG. 9 shows an exemplary method (e.g., procedure) for a RAN node configured to manage QoE measurements by UEs operating in the RAN, according to various embodiments of the present disclosure. The exemplary method can be performed by a RAN node (e.g., base station, eNB, gNB, ng-eNB, TRP, etc.) such as described elsewhere herein.

The exemplary method can include the operations of block 910, where the RAN node can receiving, from a network node or function (NNF), a first number of QoE measurement collection (QMC) configurations. The exemplary method can also include the operations of block 920, where the RAN node can identify a UE to perform QoE measurements according to the first number of QMC configurations. The exemplary method can also include the operations of block 930, where the RAN node can selectively provide the first number of QMC configurations to the UE, based on the first number and one or more of the following: a maximum number of concurrent QMC configurations the UE can retain, respective priority levels of the first number of QMC configurations, and current signaling load in the RAN.

In some embodiments, selectively providing the first number of QMC configurations to the UE in block 930 includes the following operations, labelled with corresponding sub-block numbers:

(931) determining a second number of QMC configurations currently stored by the UE;

(932) when the sum of the first number and the second number is less than or equal to the maximum number, sending the first number of QMC configurations to the UE; and (935) when the sum of the first number and the second number is greater than the maximum number, storing at least one of the first number of QMC configurations in a context for the UE.

In some of these embodiments, storing at least one of the first number of QMC configurations in a context for the UE in sub-block 935 includes storing one or more of the following indications in association with each of the at least one stored QMC configurations:

an indication that the QMC configuration has not been sent to the UE; and an indication of the reason why the QMC configuration has not been sent to the UE.

In some variants of these embodiments, the exemplary method can also include the operations of block 950, where the RAN node can send, to a second RAN node, a message including the at least one stored QMC configuration and the one or more indications stored in association therewith. For example, the message can be sent to the second RAN node in association with a handover of the UE to a target cell served by the second RAN node.

In other variants of these embodiments, the NNF is a second RAN node that serves a source cell for a UE handover, the RAN node serves a target cell for the UE handover, and the first number of QMC configurations are received from the second RAN node in association with the UE handover. As a further variant, the one or more indications stored in association with each of the at least one stored QMC configurations can be received from the second RAN node.

In some of these embodiments, for each of the first number of QMC configurations, the priority level is indicated by one or more of the following:

an explicit relative priority level, which is one of a plurality of values indicating different priority levels;

one or more parameters of the QMC configuration, from which the priority level can be inferred or determined;

an indication of whether the QMC configuration can be pre-empted or overridden by other QMC configurations;

an indication of whether the QMC configuration can pre-empt or override other QMC configurations; and whether the QMC configuration is a signaling-based QMC configuration or a management-based QMC configuration.

In some variants of these embodiments, when the sum of the first number and the second number is greater than the maximum number, selectively providing the first number of QMC configurations to the UE in block 930 also includes the following operations, labelled with corresponding sub-block numbers:

(933) dividing the first number of QMC configurations into a first portion and a second portion based on the respective priority levels, wherein the sum of the first portion and the second number is less than or equal to the maximum number; and (934) sending the first portion of QMC configurations to the UE.

In such case, the second portion is stored in the context for the UE (e.g., in sub-block 935).

In some of these embodiments, the exemplary method can also include the operations of block 960, where for each of the at least one QMC configuration stored in the UE context (e.g., in sub-block 935), the UE can discard the stored QMC configuration in response to any of the following:

sending the stored QMC configuration to the UE or to a second RAN node;

storing further QMC configurations for the UE in the UE context, such that the number of stored QMC configurations for the UE exceeds a retention limit associated with the UE; and expiration of a retention duration associated with the QMC configuration or with the UE.

In some of these embodiments, the exemplary method can also include the operations of block 940, where the UE can send to the NNF an indication that the at least one QMC configuration has been stored by the RAN node (e.g., in sub-block 935) and not sent to the UE.

In some of these embodiments, the first number, the second number, and the maximum number (i.e., used in the selectively providing operations of block 930) apply to both RAN-visible QMC configurations and non-RAN-visible QMC configurations.

In other of these embodiments, the maximum number of concurrent QMC configurations the UE can retain comprises a first maximum number that applies to RAN-visible QMC configurations and a second maximum number that applies to non-RAN-visible QMC configurations. Moreover, the sum of the first number and the second number comprises respective sums for RAN-visible QMC configurations and for non-RAN-visible QMC configurations, and selectively providing in block 930 is performed for RAN-visible QMC configurations and for non-RAN-visible QMC configurations based on the respective sums.

In some embodiments, identifying a UE to perform QoE measurements according to the first number of QMC configurations in block 920 is based on one of the following received with the first number of QMC configurations: a UE identifier (e.g., for signaling-based QMC); or an area scope and a service type (e.g., for management-based QMC).

In some embodiments, the NNF is one of the following: a second RAN node; a Service Management and Orchestration (SMO) entity; an Operation Administration Maintenance (OAM) entity; or a core network (CN) node or function.

In addition, FIG. 10 shows an exemplary method (e.g., procedure) for a UE configured to perform QoE measurements in a RAN, according to various embodiments of the present disclosure. The exemplary method can be performed by a UE (e.g., wireless device, etc.) such as described elsewhere herein.

The exemplary method can include the operations of block 1010, where the UE can receive, from a RAN node, a first number of QMC configurations. The exemplary method can also include the operations of block 1020, where the UE can selectively apply the first number of QMC configurations to perform QoE measurements. The selectively applying is based on the first number and one or more of the following: a maximum number of concurrent QMC configurations the UE can retain, and respective priority levels of the first number of QMC configurations.

In some embodiments, selectively applying the first number of QMC configurations to perform QoE measurements in block 1020 includes the following operations, labelled with corresponding sub-block numbers:

(1021) determining a second number of QMC configurations currently stored by the UE;

(1022) when the sum of the first number and the second number is less than or equal to the maximum number, applying the first number of QMC configurations to perform QoE measurements accordingly; and (1027) when the sum of the first number and the second number is greater than the maximum number, discarding at least one QMC configuration from among the first number and the second number.

In some of these embodiments, the exemplary method can also include the operations of block 1040, where the UE can send to the RAN node an indication that the at least one QMC configuration has been discarded and/or not applied by the UE. In some variants, the RAN node serves a target cell for a UE handover and the first number of QMC configurations are received in association with the UE handover.

In various embodiments, the priority level for each of the first number of QMC configurations can be indicated by one or more of the various characteristics and/or information described above in relation to RAN node embodiments.

In some of these embodiments, the second number of QMC configurations currently stored by the UE are associated with respective priority levels. When the sum of the first number and the second number is greater than the maximum number, selectively applying the first number of QMC configurations to perform QoE measurements in block 1020 also includes the following operations, labelled with corresponding sub-block numbers:

(1023) ordering QMC configurations comprising the first number and the second number according to their respective priority levels;

(1024) selecting the maximum number of the ordered QMC configurations starting from highest priority level;

(1025) retaining the selected QMC configurations that are among the second number currently stored; and (1026) applying the selected QMC configurations that are among the first number received.

In such case, the unselected QMC configurations are discarded (e.g., in sub-block 1027).

In some of these embodiments, the first number, the second number, and the maximum number (i.e., used in the selectively applying operations of block 1020) apply to both RAN-visible QMC configurations and non-RAN-visible QMC configurations.

In other of these embodiments, the maximum number of concurrent QMC configurations the UE can retain comprises a first maximum number that applies to RAN-visible QMC configurations and a second maximum number that applies to non-RAN-visible QMC configurations. Moreover, the sum of the first number and the second number comprises respective sums for RAN-visible QMC configurations and for non-RAN-visible QMC configurations, and selectively applying in block 1020 is performed for RAN-visible QMC configurations and for non-RAN-visible QMC configurations based on the respective sums.

In some embodiments, the exemplary method can also include the operations of block 1030, where the UE can discard at least one of the second number of QMC configurations currently stored by the UE, in response to one of the following: a handover of the UE to a target cell served by a second RAN node, or an instruction from the RAN node.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 11:
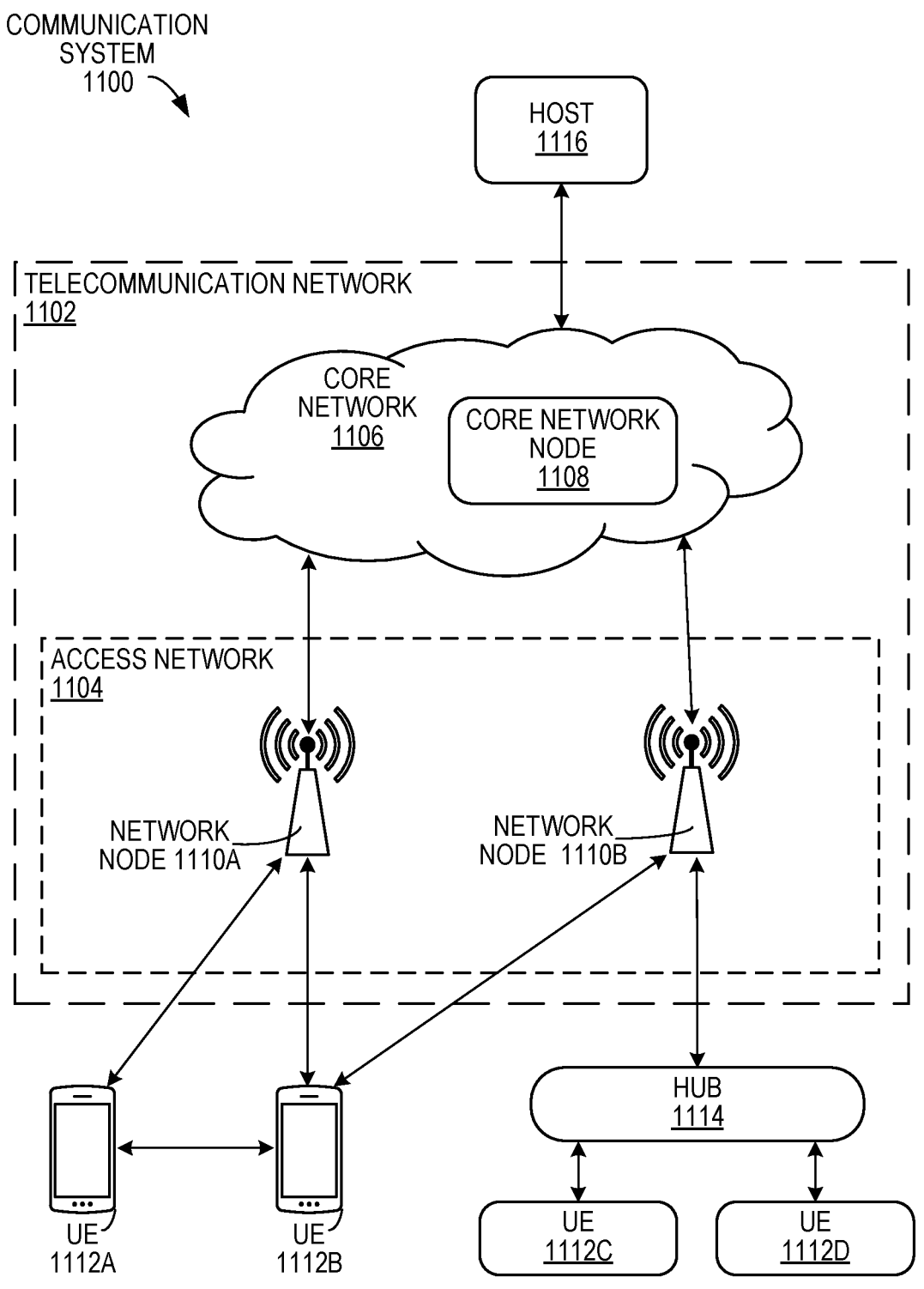
FIG. 11 shows a communication system according to various embodiments of the present disclosure.

FIG. 11 shows an example of a communication system 1100 in accordance with some embodiments. In this example, the communication system 1100 includes a telecommunication network 1102 that includes an access network 1104, such as a RAN, and a core network 1106, which includes one or more core network nodes 1108. The access network 1104 includes one or more access network nodes, such as network nodes 1110a and 1110b (one or more of which may be generally referred to as network nodes 1110), or any other similar 3GPP access node or non-3GPP access point. The network nodes 1110 facilitate direct or indirect connection of UEs, such as by connecting UEs 1112a-d (one or more of which may be generally referred to as UEs 1112) to the core network 1106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1100 may include any number of wired or wireless networks, network nodes, UEs, and/or any other components or systems that may facilitate or participate in the communication of data and/or signals whether via wired or wireless connections. The communication system 1100 may include and/or interface with any type of communication, telecommunication, data, cellular, radio network, and/or other similar type of system.

The UEs 1112 may be any of a wide variety of communication devices, including wireless devices arranged, configured, and/or operable to communicate wirelessly with the network nodes 1110 and other communication devices.

Similarly, the network nodes 1110 are arranged, capable, configured, and/or operable to communicate directly or indirectly with the UEs 1112 and/or with other network nodes or equipment in the telecommunication network 1102 to enable and/or provide network access, such as wireless network access, and/or to perform other functions, such as administration in the telecommunication network 1102.

In the depicted example, the core network 1106 connects the network nodes 1110 to one or more hosts, such as host 1116. These connections may be direct or indirect via one or more intermediary networks or devices. In other examples, network nodes may be directly coupled to hosts. The core network 1106 includes one more core network nodes (e.g., core network node 1108) that are structured with hardware and software components. Features of these components may be substantially similar to those described with respect to the UEs, network nodes, and/or hosts, such that the descriptions thereof are generally applicable to the corresponding components of the core network node 1108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1116 may be under the ownership or control of a service provider other than an operator or provider of the access network 1104 and/or the telecommunication network 1102, and may be operated by the service provider or on behalf of the service provider. The host 1116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1100 of FIG. 11 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1102 is a cellular network that implements 3GPP standardized features. Accordingly, the telecommunications network 1102 may support network slicing to provide different logical networks to different devices that are connected to the telecommunication network 1102. For example, the telecommunications network 1102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1112 are configured to transmit and/or receive information without direct human interaction. For instance, a UE may be designed to transmit information to the access network 1104 on a predetermined schedule, when triggered by an internal or external event, or in response to requests from the access network 1104. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 1114 communicates with the access network 1104 to facilitate indirect communication between one or more UEs (e.g., UE 1112*c* and/or 1112*d*) and network nodes (e.g., network node 1110*b*). In some examples, the hub 1114 may be a controller, router, content source and analytics, or any of the other communication devices described herein regarding UEs. For example, the hub 1114 may be a broadband router enabling access to the core network 1106 for the UEs. As another example, the hub 1114 may be a controller that sends commands or instructions to one or more actuators in the UEs. Commands or instructions may be received from the UEs, network nodes 1110, or by executable code, script, process, or other instructions in the hub 1114. As another example, the hub 1114 may be a data collector that acts as temporary storage for UE data and, in some embodiments, may perform analysis or other processing of the data. As another example, the hub 1114 may be a content source. For example, for a UE that is a VR headset, display, loudspeaker or other media delivery device, the hub 1114 may retrieve VR assets, video, audio, or other media or data related to sensory information via a network node, which the hub 1114 then provides to the UE either directly, after performing local processing, and/or after adding additional local content. In still another example, the hub 1114 acts as a proxy server or orchestrator for the UEs, in particular in if one or more of the UEs are low energy IoT devices.

The hub 1114 may have a constant/persistent or intermittent connection to the network node 1110*b*. The hub 1114 may also allow for a different communication scheme and/or schedule between the hub 1114 and UEs (e.g., UE 1112*c* and/or 1112*d*), and between the hub 1114 and the core network 1106. In other examples, the hub 1114 is connected to the core network 1106 and/or one or more UEs via a wired connection. Moreover, the hub 1114 may be configured to connect to an M2M service provider over the access network 1104 and/or to another UE over a direct connection. In some scenarios, UEs may establish a wireless connection with the network nodes 1110 while still connected via the hub 1114 via a wired or wireless connection. In some embodiments, the hub 1114 may be a dedicated hub—that is, a hub whose primary function is to route communications to/from the UEs from/to the network node 1110*b*. In other embodiments, the hub 1114 may be a non-dedicated hub—that is, a device which is capable of operating to route communications between the UEs and network node 1110*b*, but which is additionally capable of operating as a communication start and/or end point for certain data channels.

Figure 12:
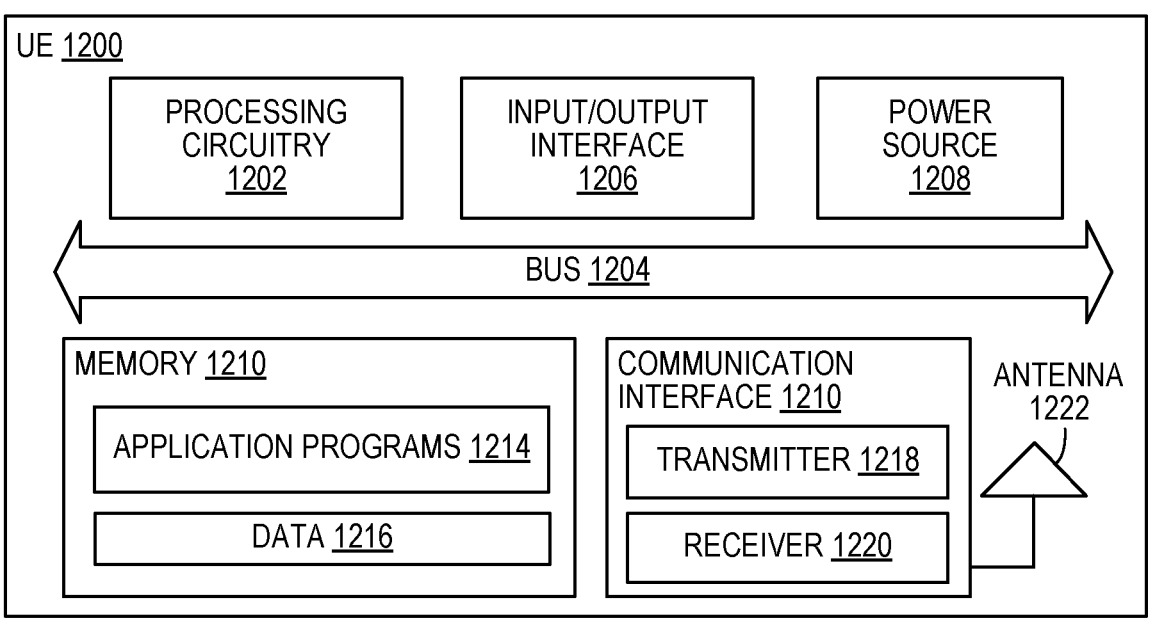
FIG. 12 shows a UE according to various embodiments of the present disclosure.

FIG. 12 shows a UE 1200 in accordance with some embodiments. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by 3GPP, including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1200 includes processing circuitry 1202 that is operatively coupled via a bus 1204 to an input/output interface 1206, a power source 1208, a memory 1210, a communication interface 1212, and/or any other component, or any combination thereof. Certain UEs may utilize all or a subset of the components shown in FIG. 12. The level of integration between the components may vary from one UE to another UE. Further, certain UEs may contain multiple instances of a component, such as multiple processors, memories, transceivers, transmitters, receivers, etc.

The processing circuitry 1202 is configured to process instructions and data and may be configured to implement any sequential state machine operative to execute instructions stored as machine-readable computer programs in the memory 1210. The processing circuitry 1202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1202 may include multiple central processing units (CPUs).

In the example, the input/output interface 1206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1208 is structured as a battery or battery pack. Other types of power sources, such as an external power source (e.g., an electricity outlet), photovoltaic device, or power cell, may be used. The power source 1208 may further include power circuitry for delivering power from the power source 1208 itself, and/or an external power source, to the various parts of the UE 1200 via input circuitry or an interface such as an electrical power cable. Delivering power may be, for example, for charging of the power source 1208. Power circuitry may perform any formatting, converting, or other modification to the power from the power source 1208 to make the power suitable for the respective components of the UE 1200 to which power is supplied.

The memory 1210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1210 includes one or more application programs 1214, such as an operating system, web browser application, a widget, gadget engine, or other application, and corresponding data 1216. The memory 1210 may store, for use by the UE 1200, any of a variety of various operating systems or combinations of operating systems.

The memory 1210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1210 may allow the UE 1200 to access instructions, application programs and the like, stored on transitory or non-transitory memory media, to off-load data, or to upload data. An article of manufacture, such as one utilizing a communication system may be tangibly embodied as or in the memory 1210, which may be or comprise a device-readable storage medium.

The processing circuitry 1202 may be configured to communicate with an access network or other network using the communication interface 1212. The communication interface 1212 may comprise one or more communication subsystems and may include or be communicatively coupled to an antenna 1222. The communication interface 1212 may include one or more transceivers used to communicate, such as by communicating with one or more remote transceivers of another device capable of wireless communication (e.g., another UE or a network node in an access network). Each transceiver may include a transmitter 1218 and/or a receiver 1220 appropriate to provide network communications (e.g., optical, electrical, frequency allocations, and so forth). Moreover, the transmitter 1218 and receiver 1220 may be coupled to one or more antennas (e.g., antenna 1222) and may share circuit components, software or firmware, or alternatively be implemented separately.

In the illustrated embodiment, communication functions of the communication interface 1212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., an alert is sent when moisture is detected), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1200 shown in FIG. 12.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 13:
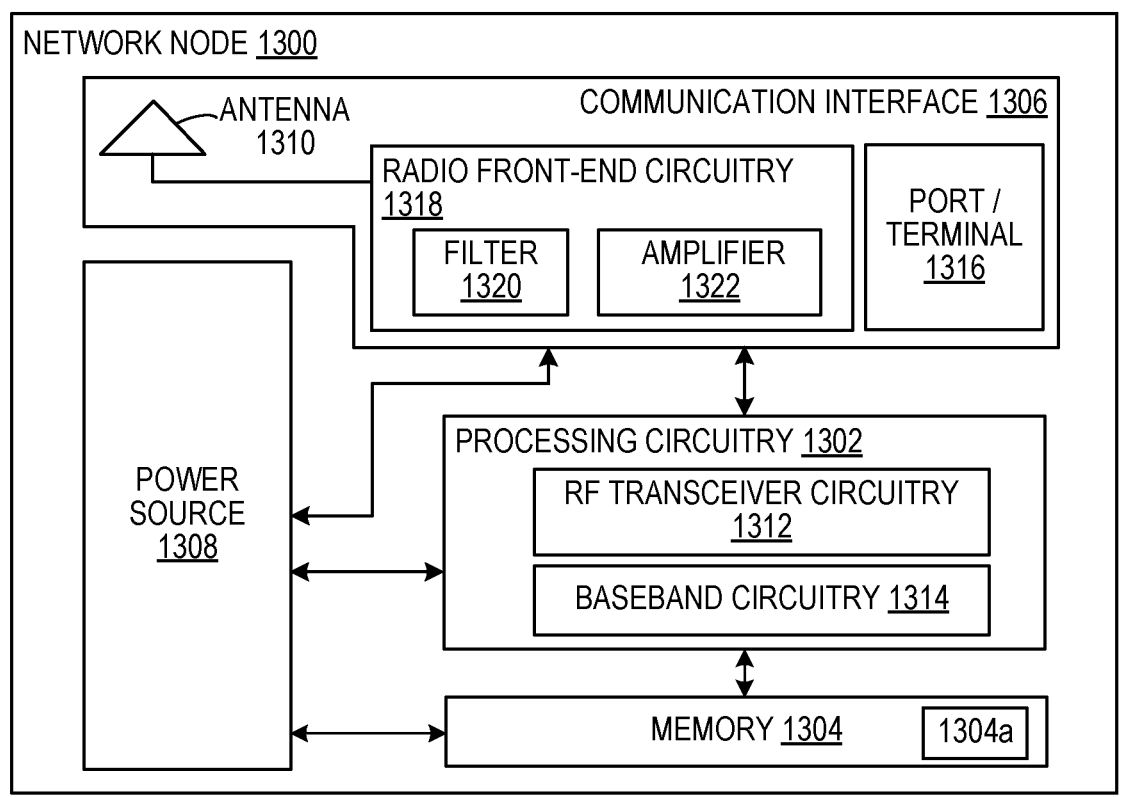
FIG. 13 shows a network node according to various embodiments of the present disclosure.

FIG. 13 shows a network node 1300 in accordance with some embodiments. Examples of network nodes include, but are not limited to, access points (APs) (e.g., radio access points), and base stations (e.g., radio base stations, Node Bs, eNBs, and gNBs). Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1300 includes a processing circuitry 1302, a memory 1304, a communication interface 1306, and a power source 1308. The network node 1300 may be composed of multiple physically separate components (e.g., a NodeB component and a RNC component, or a BTS component and a BSC component, etc.), which may each have their own respective components. In certain scenarios in which the network node 1300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1300 may be configured to support multiple radio access technologies (RATs). In such embodiments, some components may be duplicated (e.g., separate memory 1304 for different RATs) and some components may be reused (e.g., a same antenna 1310 may be shared by different RATs). The network node 1300 may also include multiple sets of the various illustrated components for different wireless technologies integrated into network node 1300, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1300.

The processing circuitry 1302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1300 components, such as the memory 1304, to provide network node 1300 functionality.

In some embodiments, the processing circuitry 1302 includes a system on a chip (SOC). In some embodiments, the processing circuitry 1302 includes one or more of radio frequency (RF) transceiver circuitry 1312 and baseband processing circuitry 1314. In some embodiments, the radio frequency (RF) transceiver circuitry 1312 and the baseband processing circuitry 1314 may be on separate chips (or sets of chips), boards, or units, such as radio units and digital units. In alternative embodiments, part or all of RF transceiver circuitry 1312 and baseband processing circuitry 1314 may be on the same chip or set of chips, boards, or units.

The memory 1304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1302. The memory 1304 may store any suitable instructions, data, or information, including a computer program, software, an application including one or more of logic, rules, code, tables, and/or other instructions (collectively denoted computer program product 1304*a*) capable of being executed by the processing circuitry 1302 and utilized by the network node 1300. The memory 1304 may be used to store any calculations made by the processing circuitry 1302 and/or any data received via the communication interface 1306. In some embodiments, the processing circuitry 1302 and memory 1304 is integrated.

The communication interface 1306 is used in wired or wireless communication of signaling and/or data between a network node, access network, and/or UE. As illustrated, the communication interface 1306 comprises port(s)/terminal(s) 1316 to send and receive data, for example to and from a network over a wired connection. The communication interface 1306 also includes radio front-end circuitry 1318 that may be coupled to, or in certain embodiments a part of, the antenna 1310. Radio front-end circuitry 1318 comprises filters 1320 and amplifiers 1322. The radio front-end circuitry 1318 may be connected to an antenna 1310 and processing circuitry 1302. The radio front-end circuitry may be configured to condition signals communicated between antenna 1310 and processing circuitry 1302. The radio front-end circuitry 1318 may receive digital data that is to be sent out to other network nodes or UEs via a wireless connection. The radio front-end circuitry 1318 may convert the digital data into a radio signal having the appropriate channel and bandwidth parameters using a combination of filters 1320 and/or amplifiers 1322. The radio signal may then be transmitted via the antenna 1310. Similarly, when receiving data, the antenna 1310 may collect radio signals which are then converted into digital data by the radio front-end circuitry 1318. The digital data may be passed to the processing circuitry 1302. In other embodiments, the communication interface may comprise different components and/or different combinations of components.

In certain alternative embodiments, the network node 1300 does not include separate radio front-end circuitry 1318, instead, the processing circuitry 1302 includes radio front-end circuitry and is connected to the antenna 1310. Similarly, in some embodiments, all or some of the RF transceiver circuitry 1312 is part of the communication interface 1306. In still other embodiments, the communication interface 1306 includes one or more ports or terminals 1316, the radio front-end circuitry 1318, and the RF transceiver circuitry 1312, as part of a radio unit (not shown), and the communication interface 1306 communicates with the baseband processing circuitry 1314, which is part of a digital unit (not shown).

The antenna 1310 may include one or more antennas, or antenna arrays, configured to send and/or receive wireless signals. The antenna 1310 may be coupled to the radio front-end circuitry 1318 and may be any type of antenna capable of transmitting and receiving data and/or signals wirelessly. In certain embodiments, the antenna 1310 is separate from the network node 1300 and connectable to the network node 1300 through an interface or port.

The antenna 1310, communication interface 1306, and/or the processing circuitry 1302 may be configured to perform any receiving operations and/or certain obtaining operations described herein as being performed by the network node. Any information, data and/or signals may be received from a UE, another network node and/or any other network equipment. Similarly, the antenna 1310, the communication interface 1306, and/or the processing circuitry 1302 may be configured to perform any transmitting operations described herein as being performed by the network node. Any information, data and/or signals may be transmitted to a UE, another network node and/or any other network equipment.

The power source 1308 provides power to the various components of network node 1300 in a form suitable for the respective components (e.g., at a voltage and current level needed for each respective component). The power source 1308 may further comprise, or be coupled to, power management circuitry to supply the components of the network node 1300 with power for performing the functionality described herein. For example, the network node 1300 may be connectable to an external power source (e.g., the power grid, an electricity outlet) via an input circuitry or interface such as an electrical cable, whereby the external power source supplies power to power circuitry of the power source 1308. As a further example, the power source 1308 may comprise a source of power in the form of a battery or battery pack which is connected to, or integrated in, power circuitry. The battery may provide backup power should the external power source fail.

Embodiments of the network node 1300 may include additional components beyond those shown in FIG. 13 for providing certain aspects of the network node's functionality, including any of the functionality described herein and/or any functionality necessary to support the subject matter described herein. For example, the network node 1300 may include user interface equipment to allow input of information into the network node 1300 and to allow output of information from the network node 1300. This may allow a user to perform diagnostic, maintenance, repair, and other administrative functions for the network node 1300.

Figure 14:
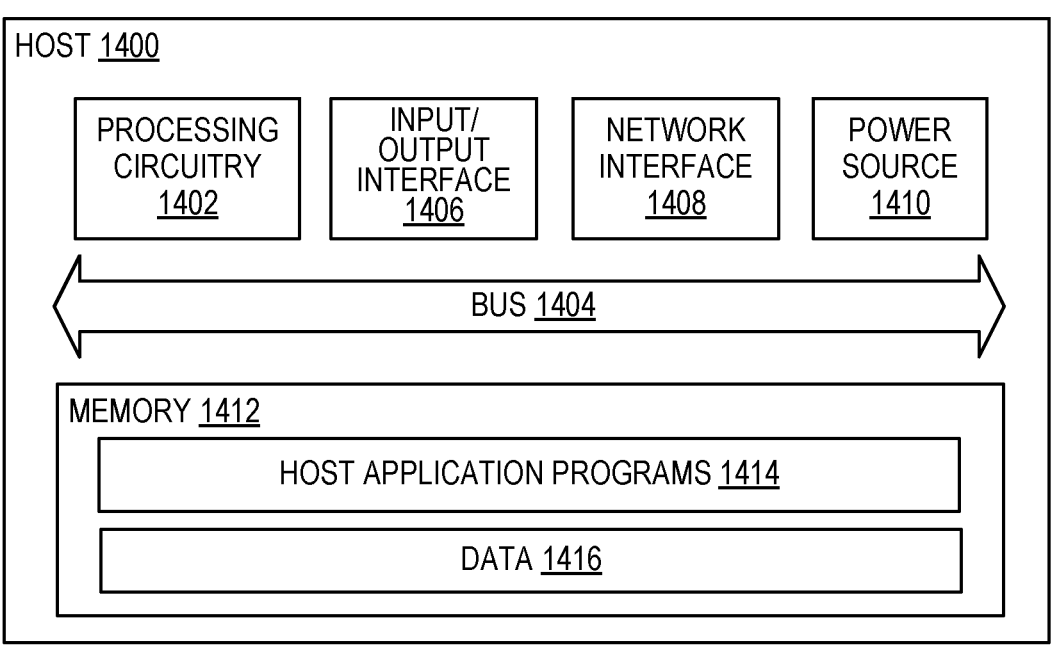
FIG. 14 shows host computing system according to various embodiments of the present disclosure.

FIG. 14 is a block diagram of a host 1400, which may be an embodiment of the host 1116 of FIG. 11, in accordance with various aspects described herein. As used herein, the host 1400 may be or comprise various combinations hardware and/or software, including a standalone server, a blade server, a cloud-implemented server, a distributed server, a virtual machine, container, or processing resources in a server farm. The host 1400 may provide one or more services to one or more UEs.

The host 1400 includes processing circuitry 1402 that is operatively coupled via a bus 1404 to an input/output interface 1406, a network interface 1408, a power source 1410, and a memory 1412. Other components may be included in other embodiments. Features of these components may be substantially similar to those described with respect to the devices of previous figures, such as FIGS. 12 and 13, such that the descriptions thereof are generally applicable to the corresponding components of host 1400.

The memory 1412 may include one or more computer programs including one or more host application programs 1414 and data 1416, which may include user data, e.g., data generated by a UE for the host 1400 or data generated by the host 1400 for a UE. Embodiments of the host 1400 may utilize only a subset or all of the components shown. The host application programs 1414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1414 may also provide for user authentication and licensing checks and may periodically report health, routes, and content availability to a central node, such as a device in or on the edge of a core network. Accordingly, the host 1400 may select and/or indicate a different host for over-the-top services for a UE. The host application programs 1414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 15:
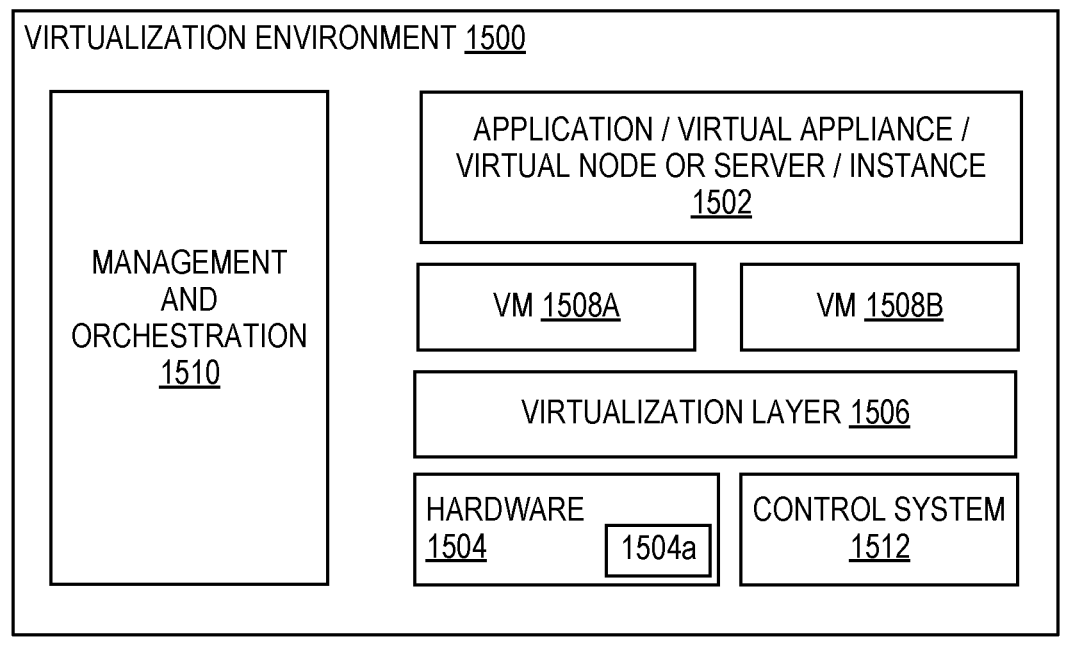
FIG. 15 is a block diagram of a virtualization environment in which functions implemented by some embodiments of the present disclosure may be virtualized.

FIG. 15 is a block diagram illustrating a virtualization environment 1500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1502 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1504 includes processing circuitry, memory that stores software and/or instructions (collectively denoted computer program product 1504a) executable by hardware processing circuitry, and/or other hardware devices as described herein, such as a network interface, input/output interface, and so forth. Software may be executed by the processing circuitry to instantiate one or more virtualization layers 1506 (also referred to as hypervisors or virtual machine monitors (VMMs)), provide VMs 1508a and 1508b (one or more of which may be generally referred to as VMs 1508), and/or perform any of the functions, features and/or benefits described in relation with some embodiments described herein. The virtualization layer 1506 may present a virtual operating platform that appears like networking hardware to the VMs 1508.

The VMs 1508 comprise virtual processing, virtual memory, virtual networking or interface and virtual storage, and may be run by a corresponding virtualization layer 1506. Different embodiments of the instance of a virtual appliance 1502 may be implemented on one or more of VMs 1508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1508 may be a software implementation of a physical machine that runs programs as if they were executing on a physical, non-virtualized machine. Each of the VMs 1508, and that part of hardware 1504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1508 on top of the hardware 1504 and corresponds to the application 1502.

Hardware 1504 may be implemented in a standalone network node with generic or specific components. Hardware 1504 may implement some functions via virtualization. Alternatively, hardware 1504 may be part of a larger cluster of hardware (e.g. such as in a data center or CPE) where many hardware nodes work together and are managed via management and orchestration 1510, which, among others, oversees lifecycle management of applications 1502. In some embodiments, hardware 1504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1512 which may alternatively be used for communication between hardware nodes and radio units.

Figure 16:
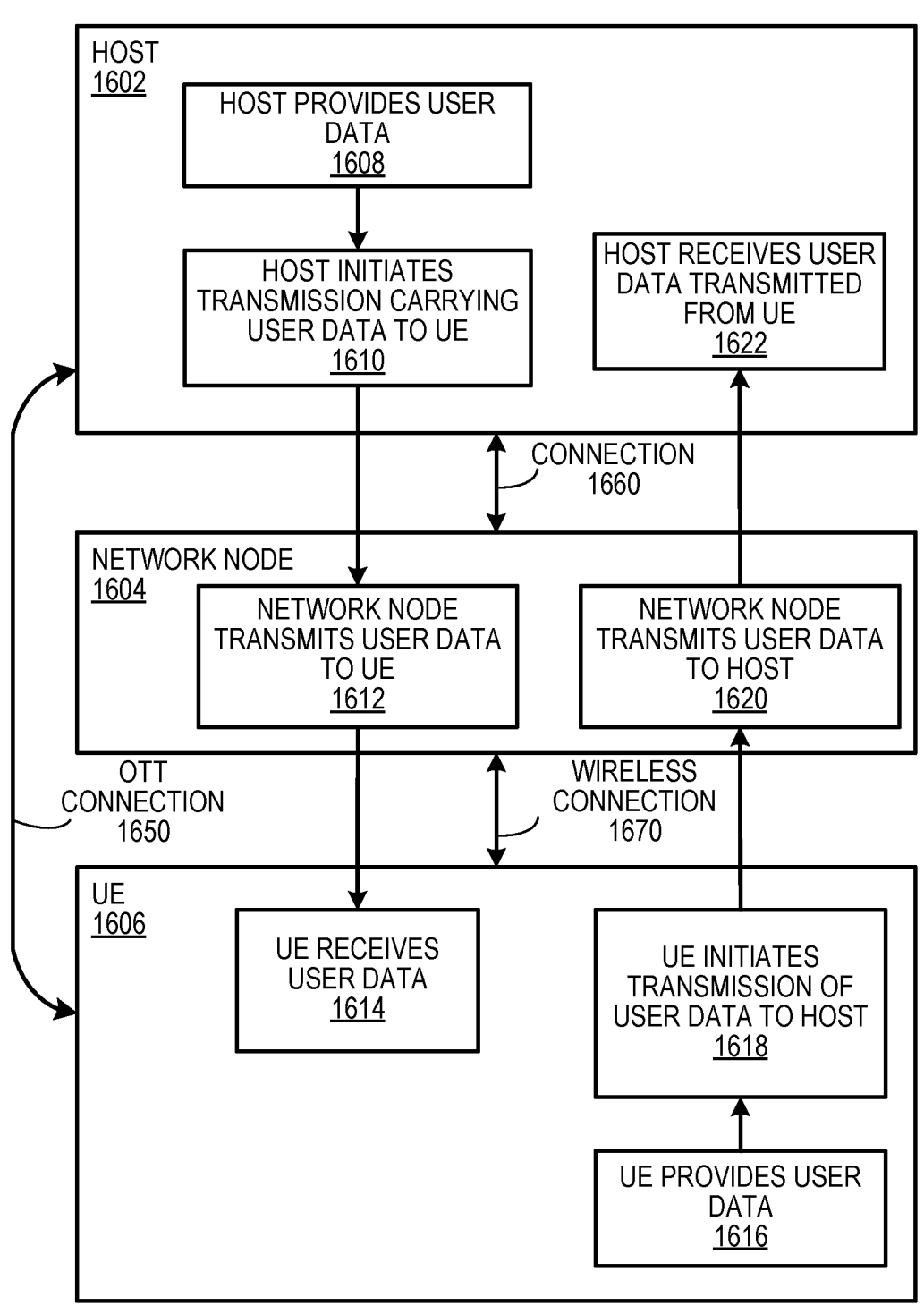
FIG. 16 illustrates communication between a host computing system, a network node, and a UE via multiple connections, at least one of which is wireless, according to various embodiments of the present disclosure.

FIG. 16 shows a communication diagram of a host 1602 communicating via a network node 1604 with a UE 1606 over a partially wireless connection in accordance with some embodiments. Example implementations, in accordance with various embodiments, of the UE (such as a UE 1112a of FIG. 11 and/or UE 1200 of FIG. 12), network node (such as network node 1110a of FIG. 11 and/or network node 1300 of FIG. 13), and host (such as host 1116 of FIG. 11 and/or host 1400 of FIG. 14) discussed in the preceding paragraphs will now be described with reference to FIG. 16.

Like host 1400, embodiments of host 1602 include hardware, such as a communication interface, processing circuitry, and memory. The host 1602 also includes software, which is stored in or accessible by the host 1602 and executable by the processing circuitry. The software includes a host application that may be operable to provide a service to a remote user, such as the UE 1606 connecting via an over-the-top (OTT) connection 1650 extending between the UE 1606 and host 1602. In providing the service to the remote user, a host application may provide user data which is transmitted using the OTT connection 1650.

The network node 1604 includes hardware enabling it to communicate with the host 1602 and UE 1606. The connection 1660 may be direct or pass through a core network (like core network 1106 of FIG. 11) and/or one or more other intermediate networks, such as one or more public, private, or hosted networks. For example, an intermediate network may be a backbone network or the Internet.

The UE 1606 includes hardware and software, which is stored in or accessible by UE 1606 and executable by the UE's processing circuitry. The software includes a client application, such as a web browser or operator-specific "app" that may be operable to provide a service to a human or non-human user via UE 1606 with the support of the host 1602. In the host 1602, an executing host application may communicate with the executing client application via the OTT connection 1650 terminating at the UE 1606 and host 1602. In providing the service to the user, the UE's client application may receive request data from the host's host application and provide user data in response to the request data. The OTT connection 1650 may transfer both the request data and the user data. The UE's client application may interact with the user to generate the user data that it provides to the host application through the OTT connection 1650.

The OTT connection 1650 may extend via a connection 1660 between the host 1602 and the network node 1604 and via a wireless connection 1670 between the network node 1604 and the UE 1606 to provide the connection between the host 1602 and the UE 1606. The connection 1660 and wireless connection 1670, over which the OTT connection 1650 may be provided, have been drawn abstractly to illustrate the communication between the host 1602 and the UE 1606 via the network node 1604, without explicit reference to any intermediary devices and the precise routing of messages via these devices.

As an example of transmitting data via the OTT connection 1650, in step 1608, the host 1602 provides user data, which may be performed by executing a host application. In some embodiments, the user data is associated with a particular human user interacting with the UE 1606. In other embodiments, the user data is associated with a UE 1606 that shares data with the host 1602 without explicit human interaction. In step 1610, the host 1602 initiates a transmission carrying the user data towards the UE 1606. The host 1602 may initiate the transmission responsive to a request transmitted by the UE 1606. The request may be caused by human interaction with the UE 1606 or by operation of the client application executing on the UE 1606. The transmission may pass via the network node 1604, in accordance with the teachings of the embodiments described throughout this disclosure. Accordingly, in step 1612, the network node 1604 transmits to the UE 1606 the user data that was carried in the transmission that the host 1602 initiated, in accordance with the teachings of the embodiments described throughout this disclosure. In step 1614, the UE 1606 receives the user data carried in the transmission, which may be performed by a client application executed on the UE 1606 associated with the host application executed by the host 1602.

In some examples, the UE 1606 executes a client application which provides user data to the host 1602. The user data may be provided in reaction or response to the data received from the host 1602. Accordingly, in step 1616, the UE 1606 may provide user data, which may be performed by executing the client application. In providing the user data, the client application may further consider user input received from the user via an input/output interface of the UE 1606. Regardless of the specific manner in which the user data was provided, the UE 1606 initiates, in step 1618, transmission of the user data towards the host 1602 via the network node 1604. In step 1620, in accordance with the teachings of the embodiments described throughout this disclosure, the network node 1604 receives user data from the UE 1606 and initiates transmission of the received user data towards the host 1602. In step 1622, the host 1602 receives the user data carried in the transmission initiated by the UE 1606.

One or more of the various embodiments improve the performance of OTT services provided to the UE 1606 using the OTT connection 1650, in which the wireless connection 1670 forms the last segment. More precisely, embodiments can enable a RAN node to maintain important UE QoE measurements even when the UE is not able to perform and/or the RAN node is not able to facilitate these QoE measurements. By storing QMC configurations for such measurements in association with an indication that they were not sent to the UE, a RAN node can later send such QMC configurations to a UE when it becomes capable of performing, or to another RAN node if the UE is handed over before becoming capable. Based on such indications, the other RAN node can perform similar operations with respect to the received QMC configurations. Thus, the postponed status of QoE measurements can be maintained during UE mobility in the RAN, until the UE can perform the postponed QoE measurements. At a high level, embodiments facilitate QoE measurements that improve QoE for end users of various services, including OTT services. In this manner, embodiments increase the value of OTT services delivered via RAN and UE, to both end users and service providers.

In an example scenario, factory status information may be collected and analyzed by the host 1602. As another example, the host 1602 may process audio and video data which may have been retrieved from a UE for use in creating maps. As another example, the host 1602 may collect and analyze real-time data to assist in controlling vehicle congestion (e.g., controlling traffic lights). As another example, the host 1602 may store surveillance video uploaded by a UE. As another example, the host 1602 may store or control access to media content such as video, audio, VR or AR which it can broadcast, multicast or unicast to UEs. As other examples, the host 1602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1650 between the host 1602 and UE 1606, in response to variations in the measurement results. The measurement procedure and/or the network functionality for reconfiguring the OTT connection may be implemented in software and hardware of the host 1602 and/or UE 1606. In some embodiments, sensors (not shown) may be deployed in or in association with other devices through which the OTT connection 1650 passes; the sensors may participate in the measurement procedure by supplying values of the monitored quantities exemplified above, or supplying values of other physical quantities from which software may compute or estimate the monitored quantities. The reconfiguring of the OTT connection 1650 may include message format, retransmission settings, preferred routing etc.; the reconfiguring need not directly alter the operation of the network node 1604. Such procedures and functionalities may be known and practiced in the art. In certain embodiments, measurements may involve proprietary UE signaling that facilitates measurements of throughput, propagation times, latency and the like, by the host 1602. The measurements may be implemented in that software causes messages to be transmitted, in particular empty or 'dummy' messages, using the OTT connection 1650 while monitoring propagation times, errors, etc.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously.

Embodiments of the techniques and apparatus described herein also include, but are not limited to, the following enumerated examples:

A1. A method performed by a user equipment, UE, for Quality of Experience, QoE, monitoring, the method comprising:
  receiving a first QoE configuration from a network node; and
  configuring the UE with the received first QoE configuration.

A2. The method of embodiment 1 further comprising the step of releasing an existing second QoE configuration at the UE prior to configuring the UE with the received first QoE configuration.

A3. The method of embodiment 2, wherein the UE is handed over from a source network node to a target network node, and the existing second QoE configuration is released from the UE as a consequence of the handover process.

A4. The method of any of embodiments 2 and 3, wherein at least the received first QoE configuration and the existing second QoE configuration have associated priority levels, and the priority level of the first QoE configuration is higher than that of the second QoE configuration.

A5. The method of any of embodiments 2 to 4, wherein the UE releases the existing second QoE configuration in response to an instruction from the network node.

A6. The method of any of the previous embodiments, further comprising:

providing user data; and forwarding the user data to a host via the transmission to the network node.

B1. A method performed by a network node for Quality of Experience, QoE, monitoring, the method comprising:

determining whether to configure a user equipment, UE, with a first QoE configuration;

if it is determined to configure the UE with the first QoE configuration, sending the QoE configuration to the UE; and if it is determined not to configure the UE with the first QoE configuration, storing the QoE configuration at the network node.

B2. The method of embodiment B1, wherein the determination of whether to configure the UE with the first QoE configuration is based on at least one of:

whether it is possible to configure the UE with the first QoE configuration; and/or whether it is desirable to configure the UE with the first QoE configuration.

B3. The method of any of embodiments B1-B2 wherein, when storing the first QoE configuration, the stored first QoE configuration is associated with the UE.

B4. The method of embodiment B3 wherein, when storing the first QoE configuration, an indication and/or flag is added to the stored first QoE configuration.

B5. The method of embodiment B4, wherein the indication and/or flag indicates that the stored first QoE configuration has not been sent to the UE.

B6. The method of embodiment B5, wherein the indication and/or flag indicates the reason(s) that the stored first QoE configuration has not been sent to the UE.

B7. The method of any of embodiments B4-B6, further comprising receiving the first QoE configuration from a network entity prior to determining whether to configure the UE with the first QoE configuration, wherein the indication and/or flag indicates the network entity from which the network node receives the first QoE configuration.

B8 The method of embodiment B7, wherein the network entity is one of the following:

a further network node;

an Access and Mobility Management Function, AMF;

a Service Management and Orchestration entity, SMO;

an Operation Administration Maintenance, OAM, entity, OAM; or a Core Network, CN, node.

B9. The method of any of embodiments B7-B8, further comprising informing the network entity that the first QoE configuration has been stored at the network node and not sent to the UE.

B10. The method of embodiment B9, further comprising informing the network entity of the reason that the first QoE configuration has been stored at the network node and not sent to the UE.

B11. The method of any of embodiments B1-B10, wherein determining whether to configure the UE with the first QoE configuration comprises checking whether or not the UE is configured with fewer QoE configurations than the maximum number of the QoE configurations the UE is capable of being configured with and/or fewer QoE configurations than the maximum number of the QoE configuration that the network node is allowed to configure or decides to configure.

B12. The method of any of embodiments B1-B11, further comprising, subsequent to storing the first QoE configuration at the network node, sending the first QoE configuration to the UE.

B13. The method of embodiment B12 further comprising, if an indication and/or flag has been added to the stored first QoE configuration, removing the indication and/or flag when sending the first QoE configuration to the UE.

B14. The method of any of embodiments B1-B11, wherein the network node is a source network node, and the method further comprises handing over the UE to a target network node and sending the first QoE configuration to the target network node.

B15. The method of embodiment B14, further comprising sending any flag and/or indication added to the first QoE configuration to the target network node.

B16. The method of any of embodiments B1-B11, wherein the network node is a target network node, and the method further comprises receiving the handed over UE from a source network node and receiving the first QoE configuration from the source network node.

B17. The method of embodiment B16, further comprising receiving any flag and/or indication added to the first QoE configuration from the source network node.

B18. The method of any of embodiments B1-B17, wherein the first QoE configuration has an associated priority level, and the step of determining whether to configure the UE with the first QoE configuration comprises determining whether the UE is configured with a second QoE configuration having a lower priority level than the priority level of the first QoE configuration.

B19. The method of any of embodiments B1-B18, further comprising, when it is determined to store the first QoE configuration at the network node because a maximum number of simultaneous QoE configurations for the UE has been reached:

delaying sending the first QoE configuration to the UE until one of the ongoing sessions pertaining to a pre-existing QoE configuration at the UE has ended; and when one of the ongoing sessions has ended, sending the first QoE configuration to the UE.

B20. The method of any of embodiments B1-B19, further comprising:

obtaining user data; and forwarding the user data to a host or a user equipment.

C1. A user equipment (UE) for Quality of Experience, QoE, monitoring, comprising:

processing circuitry configured to cause the user equipment to perform operations of any of embodiments A1-A6; and power supply circuitry configured to supply power to the processing circuitry.

C2. A network node for Quality of Experience, QoE, monitoring, the network node comprising:

processing circuitry configured to cause the network node to perform operations of any of embodiments B1-B20;

power supply circuitry configured to supply power to the processing circuitry.

C3. A user equipment (UE) for Quality of Experience, QoE, monitoring, the UE comprising: an antenna configured to send and receive wireless signals;

radio front-end circuitry connected to the antenna and to processing circuitry, and configured to condition signals communicated between the antenna and the processing circuitry;

the processing circuitry being configured to perform operations of any of embodiments A1-A6;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

C4. A host configured to operate in a communication system to provide an over-the-top (OTT) service, the host comprising:

processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform operations of any of embodiments A1-A6 to receive the user data from the host.

C5. The host of embodiment C4, wherein the cellular network further includes a network node configured to communicate with the UE to transmit the user data to the UE from the host.

C6. The host of any of embodiments C4-C5, wherein:

the processing circuitry of the host is configured to execute a host application, thereby providing the user data; and the host application is configured to interact with a client application executing on the UE, the client application being associated with the host application.

C7. A method implemented by a host operating in a communication system that further includes a network node and a user equipment (UE), the method comprising:

providing user data for the UE; and initiating a transmission carrying the user data to the UE via a cellular network comprising the network node, wherein the UE performs operations of any of embodiments A1-A6 to receive the user data from the host.

C8. The method of embodiment C7, further comprising, at the host, executing a host application associated with a client application executing on the UE to receive the user data from the UE.

C9. The method of embodiment C8, further comprising:

at the host, transmitting input data to the client application executing on the UE, the input data being provided by executing the host application, wherein the user data is provided by the client application in response to the input data from the host application.

C10. A host configured to operate in a communication system to provide an over-the-top (OTT) service, the host comprising:

processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform operations of any of embodiments A1-A6 to transmit the user data to the host.

C11. The host of embodiment C10, wherein the cellular network further includes a network node configured to communicate with the UE to transmit the user data from the UE to the host.

C12. The host of any of embodiments C10-C11, wherein:

the processing circuitry of the host is configured to execute a host application, thereby providing the user data; and the host application is configured to interact with a client application executing on the UE, the client application being associated with the host application.

C13. A method implemented by a host configured to operate in a communication system that further includes a network node and a user equipment (UE), the method comprising:

at the host, receiving user data transmitted to the host via the network node by the UE, wherein the UE performs operations of any of embodiments A1-A6 to transmit the user data to the host.

C14. The method of embodiment C13, further comprising, at the host, executing a host application associated with a client application executing on the UE to receive the user data from the UE.

C15. The method of embodiment C14, further comprising:

at the host, transmitting input data to the client application executing on the UE, the input data being provided by executing the host application, wherein the user data is provided by the client application in response to the input data from the host application.

C16. A host configured to operate in a communication system to provide an over-the-top (OTT) service, the host comprising:

processing circuitry configured to provide user data; and a network interface configured to initiate transmission of the user data to a network node in a cellular network for transmission to a user equipment (UE), the network node having a communication interface and processing circuitry, the processing circuitry of the network node configured to perform operations of any of embodiments B1-B20 to transmit the user data from the host to the UE.

C17. The host of embodiment C16, wherein:

the processing circuitry of the host is configured to execute a host application that provides the user data; and the UE comprises processing circuitry configured to execute a client application associated with the host application to receive the transmission of user data from the host.

C18. A method implemented in a host configured to operate in a communication system that further includes a network node and a user equipment (UE), the method comprising:

providing user data for the UE; and initiating a transmission carrying the user data to the UE via a cellular network comprising the network node, wherein the network node performs operations of any of embodiments B1-B20 to transmit the user data from the host to the UE.

C19. The method of embodiment C18, further comprising, at the network node, transmitting the user data provided by the host for the UE.

C20. The method of any of embodiments C18-C19, wherein the user data is provided at the host by executing a host application that interacts with a client application executing on the UE, the client application being associated with the host application.

C21. A communication system configured to provide an over-the-top service, the communication system comprising:

a host comprising:

processing circuitry configured to provide user data for a user equipment (UE), the user data being associated with the over-the-top service; and a network interface configured to initiate transmission of the user data toward a cellular network node for transmission to the UE, the network node having a communication interface and processing circuitry, the processing circuitry of the network node configured to perform operations of any of embodiments B1-B20 to transmit the user data from the host to the UE.

C22. The communication system of embodiment C21, further comprising the network node and/or the user equipment.

C23. A host configured to operate in a communication system to provide an over-the-top (OTT) service, the host comprising:

processing circuitry configured to initiate receipt of user data; and a network interface configured to receive the user data from a network node in a cellular network, the network node having a communication interface and processing circuitry, the processing circuitry of the network node configured to perform operations of any of embodiments B1-B20 to receive the user data from a user equipment (UE) for the host.

C24. The host of embodiment C23, wherein:

the processing circuitry of the host is configured to execute a host application, thereby providing the user data; and the host application is configured to interact with a client application executing on the UE, the client application being associated with the host application.

C25. The host of any of embodiments C23-C24, wherein the initiating receipt of the user data comprises requesting the user data.

C26. A method implemented by a host configured to operate in a communication system that further includes a network node and a user equipment (UE), the method comprising:

at the host, initiating receipt of user data from the UE, the user data originating from a transmission which the network node has received from the UE, wherein the network node performs operations of any of embodiments B1-B20 to receive the user data from the UE for the host.

C27. The method of embodiment C26, further comprising at the network node, transmitting the received user data to the host.

The invention claimed is:

1. A method performed by a radio access network (RAN) node configured to manage quality-of-experience (QoE) measurements by user equipment (UEs) operating in the RAN, the method comprising:

receiving, from a network node or function (NNF), a first number of QoE measurement collection (QMC) configurations;

identifying a UE to perform QoE measurements according to the first number of QMC configurations; and selectively providing the first number of QMC configurations to the UE, based on the first number and one or more of the following: a maximum number of concurrent QMC configurations the UE can retain, respective priority levels of the first number of QMC configurations, and current signaling load in the RAN.

2. The method of claim 1, wherein selectively providing the first number of QMC configurations to the UE comprises:

determining a second number of QMC configurations currently stored by the UE;

when a sum of the first number and the second number is less than or equal to the maximum number, sending the first number of QMC configurations to the UE; and when the sum of the first number and the second number is greater than the maximum number, storing at least one of the first number of QMC configurations in a context for the UE.

3. The method of claim 2, wherein storing at least one of the first number of QMC configurations in a context for the UE comprises storing one or more of the following indications in association with each of the at least one stored QMC configurations:

an indication that the QMC configuration has not been sent to the UE; and an indication of the reason why the QMC configuration has not been sent to the UE.

4. The method of claim 3, further comprising sending, to a second RAN node, a message including the at least one stored QMC configuration and the one or more indications stored in association therewith, wherein the message is sent to the second RAN node in association with a handover of the UE to a target cell served by the second RAN node.

5. The method of claim 3, wherein:

the NNF is a second RAN node that serves a source cell for a UE handover, the RAN node serves a target cell for the UE handover, the first number of QMC configurations are received in association with the UE handover, and, the one or more indications stored in association with each of the at least one stored QMC configurations are received from the second RAN node.

6. The method of claim 2, wherein for each of the first number of QMC configurations, the priority level is indicated by one or more of the following:

an explicit relative priority level, which is one of a plurality of values indicating different priority levels;

one or more parameters of the QMC configuration, from which the priority level can be inferred or determined;

an indication of whether the QMC configuration can be pre-empted or overridden by other QMC configurations;

an indication of whether the QMC configuration can pre-empt or override other QMC configurations; and whether the QMC configuration is a signaling-based QMC configuration or a management-based QMC configuration.

7. The method of claim 6, wherein selectively providing the one or more QMC configurations to the UE further comprises, when the sum of the first number and the second number is greater than the maximum number:

dividing the first number of QMC configurations into a first portion of QMC configurations and a second portion of QMC configurations based on the respective priority levels, wherein the sum of the first portion and the second number is less than or equal to the maximum number; and sending the first portion to the UE, wherein the second portion is stored in the context for the UE.

8. The method of claim 2, further comprising, for each of the at least one QMC configuration stored in the UE context, discarding the stored QMC configuration in response to any of the following:

sending the stored QMC configuration to the UE or to a second RAN node;

storing further QMC configurations for the UE in the UE context, such that the number of stored QMC configurations for the UE exceeds a retention limit associated with the UE; and expiration of a retention duration associated with the QMC configuration or with the UE.

9. The method of claim 2, further comprising sending to the NNF an indication that the at least one QMC configuration has been stored by the RAN node and not sent to the UE.

10. The method of claim 2, wherein:

the maximum number of concurrent QMC configurations the UE can retain comprises a first maximum number that applies to RAN-visible QMC configurations and a second maximum number that applies to non-RAN-visible QMC configurations;

the sum of the first number and the second number comprises respective sums for RAN-visible QMC configurations and for non-RAN-visible QMC configurations; and selectively providing is performed for RAN-visible QMC configurations and for non-RAN-visible QMC configurations based on the respective sums.

11. The method of claim 1, wherein identifying a UE to perform QoE measurements according to the first number of QMC configurations is based on one of the following received with the first number of QMC configurations:

a UE identifier; or an area scope and a service type.

12. A method for a user equipment (UE) configured to perform quality-of-experience (QoE) measurements in a radio access network (RAN), the method comprising:

receiving, from a RAN node, a first number of QoE measurement collection (QMC) configurations; and selectively applying the first number of QMC configurations to perform QoE measurements, wherein the selectively applying is based on the first number and one or more of the following: a maximum number of concurrent QMC configurations the UE can retain, and respective priority levels of the first number of QMC configurations.

13. The method of claim 12, wherein selectively applying the first number of QMC configurations to perform QoE measurements comprises:

determining a second number of QMC configurations currently stored by the UE;

when the sum of the first number and the second number is less than or equal to the maximum number, applying the first number of QMC configurations to perform QoE measurements accordingly; and when the sum of the first number and the second number is greater than the maximum number, discarding at least one QMC configuration from among the first number and the second number.

14. The method of claim 13, wherein:

the RAN node serves a target cell for a UE handover, the first number of QMC configurations are received in association with the UE handover, and the method further comprises sending to the RAN node an indication that the at least one QMC configuration has been discarded and/or not applied by the UE.

15. The method of claim 13, wherein for each of the first number of QMC configurations, the priority level is indicated by one or more of the following:

an explicit relative priority level, which is one of a plurality of values indicating different priority levels;

one or more parameters of the QMC configuration, from which the priority level can be inferred or determined;

an indication of whether the QMC configuration can be pre-empted or overridden by other QMC configurations;

an indication of whether the QMC configuration can pre-empt or override other QMC configurations; and whether the QMC configuration is a signaling-based QMC configuration or a management-based QMC configuration.

16. The method of claim 13, wherein:

the second number of QMC configurations currently stored by the UE are associated with respective priority levels; and selectively applying the first number of QMC configurations to perform QoE measurements further comprises, when the sum of the first number and the second number is greater than the maximum number:

ordering QMC configurations comprising the first number and the second number according to their respective priority levels;

selecting the maximum number of the ordered QMC configurations starting from highest priority level;

retaining the selected QMC configurations that are among the second number currently stored; and applying the selected QMC configurations that are among the first number received, wherein the unselected QMC configurations are discarded.

17. The method of claim 13, wherein:

the maximum number of concurrent QMC configurations the UE can retain comprises a first maximum number that applies to RAN-visible QMC configurations and a second maximum number that applies to non-RAN-visible QMC configurations;

the sum of the first number and the second number comprises respective sums for RAN-visible QMC configurations and for non-RAN-visible QMC configurations; and selectively applying is performed for RAN-visible QMC configurations and for non-RAN-visible QMC configurations based on the respective sums.

18. The method of claim 13, further comprising discarding at least one of the second number of QMC configurations currently stored by the UE in response to one of the following: a handover of the UE to a target cell served by a second RAN node, or an instruction from the RAN node.

19. A user equipment (UE) configured to perform quality-of-experience (QoE) measurements in a radio access network (RAN), the UE comprising:

communication interface circuitry configured to communicate with one or more RAN nodes; and processing circuitry operatively coupled to the communication interface circuitry, whereby the processing circuitry and the communication interface circuitry are configured to perform the method of claim 12.

20. A radio access network (RAN) node configured to manage quality-of-experience (QoE) measurements by user equipment (UEs) operating in the RAN, the RAN node comprising:

communication interface circuitry configured to communicate with UEs and with one or more other network nodes or functions (NNFs); and processing circuitry operatively coupled to the communication interface circuitry, whereby the processing circuitry and the communication interface circuitry are configured to:

receive, from an NNF, a first number of QoE measurement collection (QMC) configurations;

identify a UE to perform QoE measurements according to the first number of QMC configurations; and selectively provide the first number of QMC configurations to the UE, based on the first number and one or more of the following: a maximum number of concurrent QMC configurations the UE can retain, respective priority levels of the first number of QMC configurations, and current signaling load in the RAN.

\* \* \* \* \*